United States Patent
Hanrahan

(10) Patent No.: US 12,552,545 B1
(45) Date of Patent: Feb. 17, 2026

(54) DRIVETRAIN FOR AIRCRAFT POWERPLANT WITH BOOSTED TURBINE ENGINE

(71) Applicant: RTX Corporation, Farmington, CT (US)

(72) Inventor: Paul R. Hanrahan, Sedona, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/068,557

(22) Filed: Mar. 3, 2025

(51) Int. Cl.
| | |
|---|---|
| *F16H 57/03* | (2012.01) |
| *B64D 35/022* | (2024.01) |
| *F16H 57/037* | (2012.01) |
| *F16H 57/02* | (2012.01) |

(52) U.S. Cl.
CPC ......... *B64D 35/022* (2024.01); *F16H 57/037* (2013.01); *F16H 2057/02043* (2013.01)

(58) Field of Classification Search
CPC ............. B64D 35/022; F02C 7/32; F02C 7/36
See application file for complete search history.

(56) References Cited

U.S. PATENT DOCUMENTS

| | | | |
|---|---|---|---|
| 3,963,372 | A | 6/1976 | McLain |
| 5,413,879 | A | 5/1995 | Domeracki |
| 5,555,722 | A | 9/1996 | Mehr-Ayin |
| 5,562,190 | A | 10/1996 | McArthur |
| 6,834,831 | B2 | 12/2004 | Daggett |
| 8,118,253 | B1 | 2/2012 | Casado Abarquero |
| 10,724,432 | B2 | 7/2020 | Shapiro |
| 10,760,484 | B2 | 9/2020 | Alecu |
| 10,822,100 | B2 | 11/2020 | Dindar |
| 11,143,142 | B2 | 10/2021 | Hanrahan |
| 11,239,470 | B2 | 2/2022 | Hart |
| 11,415,044 | B2 | 8/2022 | Kupratis |
| 11,519,337 | B2 | 12/2022 | Redford |
| 11,629,646 | B2 * | 4/2023 | Kupratis ................ B64D 13/02 60/803 |
| 11,639,690 | B1 | 5/2023 | Kupratis |
| 11,873,766 | B2 * | 1/2024 | Kupratis ................... F02C 7/36 |
| 11,898,490 | B2 * | 2/2024 | Hanrahan ................. F02C 7/32 |

(Continued)

FOREIGN PATENT DOCUMENTS

EP 3693578 B1 * 10/2024 ............. F16H 57/08

*Primary Examiner* — Derek D Knight
(74) *Attorney, Agent, or Firm* — Getz Balich LLC

(57) ABSTRACT

An assembly for an aircraft powerplant includes a first powerplant component, a differential geartrain, a first clutch, a second clutch and a first turbine engine. The first powerplant component includes a first component rotor. The differential geartrain includes a first geartrain component and a second geartrain component. The first clutch is configured to operatively couple the first geartrain component to the first component rotor during a first mode. The first clutch is configured to operatively decouple the first geartrain component from the first component rotor during a second mode. The second clutch is configured to operatively decouple the second geartrain component from the first component rotor during the first mode. The second clutch is configured to operatively couple the second geartrain component to the first component rotor during the second mode. The first turbine engine includes a first engine rotating structure operatively coupled to the second geartrain component.

20 Claims, 14 Drawing Sheets

(56) References Cited

U.S. PATENT DOCUMENTS

| | | |
|---|---|---|
| 11,970,282 B2 | 4/2024 | Wang |
| 11,976,598 B2 | 5/2024 | Hanrahan |
| 12,037,127 B2 | 7/2024 | Palmer |
| 12,253,021 B2 * | 3/2025 | Hanrahan ................. F02C 9/42 |
| 2005/0284150 A1 | 12/2005 | Dittmar |
| 2006/0260323 A1 | 11/2006 | Moulebhar |
| 2011/0173988 A1 | 7/2011 | Sweet |
| 2012/0153076 A1 | 6/2012 | Burns |
| 2015/0122944 A1 | 5/2015 | Dauriac |
| 2015/0275758 A1 | 10/2015 | Foutch |
| 2016/0273396 A1 | 9/2016 | Ekanayake |
| 2016/0355272 A1 | 12/2016 | Moxon |
| 2018/0051584 A1 | 2/2018 | Malkamäki |
| 2018/0141675 A1 | 5/2018 | Halsey |
| 2018/0163558 A1 | 6/2018 | Vondrell |
| 2018/0291807 A1 | 10/2018 | Dalal |
| 2019/0323426 A1 | 10/2019 | Mackin |
| 2020/0040848 A1 | 2/2020 | Hanrahan |
| 2020/0056497 A1 | 2/2020 | Terwilliger |
| 2020/0158213 A1 | 5/2020 | Leque |
| 2020/0400077 A1 | 12/2020 | Redford |
| 2025/0035013 A1 * | 1/2025 | Miller ..................... F01D 25/18 |

\* cited by examiner

DRIVETRAIN FOR AIRCRAFT POWERPLANT WITH BOOSTED TURBINE ENGINE

BACKGROUND OF THE DISCLOSURE

1. Technical Field

This disclosure relates generally to an aircraft and, more particularly, to an inter-component drivetrain for an aircraft powerplant.

2. Background Information

Various types and configurations of powerplants are known in the art for an aircraft. Various drivetrains are also known in the art for an aircraft powerplant. While these known aircraft powerplants and drivetrains have various benefits, there is still room in the art for improvement.

SUMMARY OF THE DISCLOSURE

According to an aspect of the present disclosure, an assembly is provided for an aircraft powerplant. This assembly includes a first powerplant component, a differential geartrain, a first clutch, a second clutch and a first turbine engine. The first powerplant component includes a first component rotor. The differential geartrain includes a first geartrain component and a second geartrain component. The first clutch is configured to operatively couple the first geartrain component to the first component rotor during a first mode. The first clutch is configured to operatively decouple the first geartrain component from the first component rotor during a second mode. The second clutch is configured to operatively decouple the second geartrain component from the first component rotor during the first mode. The second clutch is configured to operatively couple the second geartrain component to the first component rotor during the second mode. The first turbine engine includes a first engine rotating structure operatively coupled to the second geartrain component.

According to another aspect of the present disclosure, another assembly is provided for an aircraft powerplant. This assembly includes a first powerplant component, a differential geartrain, a first clutch, a second clutch and a turbine engine. The first powerplant component includes a first component rotor. The differential geartrain includes a first geartrain component, a second geartrain component and a third geartrain component. The first clutch is configured to operatively couple the first geartrain component to the first component rotor during a first mode. The first clutch is configured to operatively decouple the first geartrain component from the first component rotor during a second mode. The second clutch is configured to operatively decouple the second geartrain component from the first component rotor during the first mode. The second clutch is configured to operatively couple the second geartrain component to the first component rotor during the second mode. The turbine engine includes an engine rotating structure operatively coupled to the third geartrain component.

According to still another aspect of the present disclosure, another assembly is provided for an aircraft powerplant. This assembly includes a first gear system, a second gear system, a third gear system, a first sprag clutch, a second sprag clutch and a fluid clutch. The first sprag clutch is configured to operatively couple the first gear system to the third gear system during a first mode. The first sprag clutch is configured to operatively decouple the first gear system from the third gear system during a second mode. The second sprag clutch is configured to operatively decouple the second gear system from the third gear system during the first mode. The second sprag clutch is configured to operatively couple the second gear system to the third gear system during the second mode. The fluid clutch is configured to operatively couple the first gear system to the third gear system independent of the first sprag clutch during a third mode.

The differential geartrain may include a sun gear, a ring gear, a plurality of intermediate gears and a carrier. The sun gear may be configured as or otherwise include the third geartrain component. The ring gear may be configured as or otherwise include the first geartrain component. The ring gear may circumscribe the sun gear. The intermediate gears may be disposed between and meshed with the sun gear and the ring gear. The carrier may be configured as or otherwise include the second geartrain component. The intermediate gears may be rotatably mounted to the carrier.

The assembly may also include an accessory gearbox including the differential geartrain, the first clutch and the second clutch. The first powerplant component may be configured as a powerplant accessory mounted to the accessory gearbox.

The first powerplant component may be configured as an electric machine. The electric machine may be configurable as an electric motor and/or an electric generator.

The assembly may also include an accessory gearbox and a powerplant accessory. The accessory gearbox may include the differential geartrain, the first clutch and the second clutch. The powerplant accessory may be mounted to the accessory gearbox. The powerplant accessory may include an accessory rotor operatively coupled to the first geartrain component through the first clutch during the first mode. The accessory rotor may be operatively coupled to the first geartrain component through the second clutch during the second mode.

The accessory rotor may be operatively coupled to the first component rotor independent of the first clutch and the second clutch.

The assembly may also include a second turbine engine. The second turbine engine may include a second engine rotating structure operatively coupled to a third geartrain component. The differential geartrain may also include the third geartrain component.

The assembly may also include a propulsor rotor operatively coupled to the second engine rotating structure.

The assembly may also include a gear system operatively coupling the first engine rotating structure to the third geartrain component. The propulsor rotor may be operatively coupled to the second engine rotating structure independent of the gear system.

The propulsor rotor may be a ducted propulsor rotor.

The propulsor rotor may be an open propulsor rotor.

The assembly may also include an electric machine and a gear system. The electric machine may include an electric machine rotor. The electric machine may be configurable as an electric motor and/or an electric generator. The gear system may operatively couple the second engine rotating structure and the electric machine rotor to the third geartrain component.

The electric machine rotor may be operatively coupled to the second engine rotating structure through the gear system.

The first turbine engine may include a first engine flowpath, a first engine compressor section, a first engine combustor section and a first engine turbine section. The first engine flowpath may extend through the first engine compressor section, the first engine combustor section and the first engine turbine section from a first engine flowpath inlet into the first engine flowpath to a first engine flowpath outlet from the first engine flowpath. The second turbine engine may include a second engine flowpath, a second engine compressor section, a second engine combustor section and a second engine turbine section. The second engine flowpath may extend through the second engine compressor section, the second engine combustor section and the second engine turbine section from a second engine flowpath inlet into the second engine flowpath to a second engine flowpath exhaust from the second engine flowpath. The first engine flowpath inlet and the first engine flowpath outlet may each be fluidly coupled with the second engine flowpath.

The second engine combustor section may include a second engine combustor. The first engine flowpath inlet and the first engine flowpath outlet may each be fluidly coupled with the second engine flowpath upstream of the second engine combustor.

The first engine flowpath inlet may be at or upstream of the first engine flowpath outlet along the second engine flowpath.

The first engine rotating structure may be operatively coupled to the second geartrain component independent of the second clutch.

The differential geartrain may include a sun gear, a ring gear, a plurality of intermediate gears and a carrier. The ring gear may be configured as or otherwise include the first geartrain component. The ring gear may circumscribe the sun gear. The intermediate gears may be disposed between and meshed with the sun gear and the ring gear. The carrier may be configured as or otherwise include the second geartrain component. The intermediate gears may be rotatably mounted to the carrier.

The assembly may also include a second turbine engine. The second turbine engine may include a second engine rotating structure operatively coupled to the sun gear.

The assembly may also include a fluid clutch configured to operatively couple the first component rotor to the first geartrain component independent of the first clutch during a third mode.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
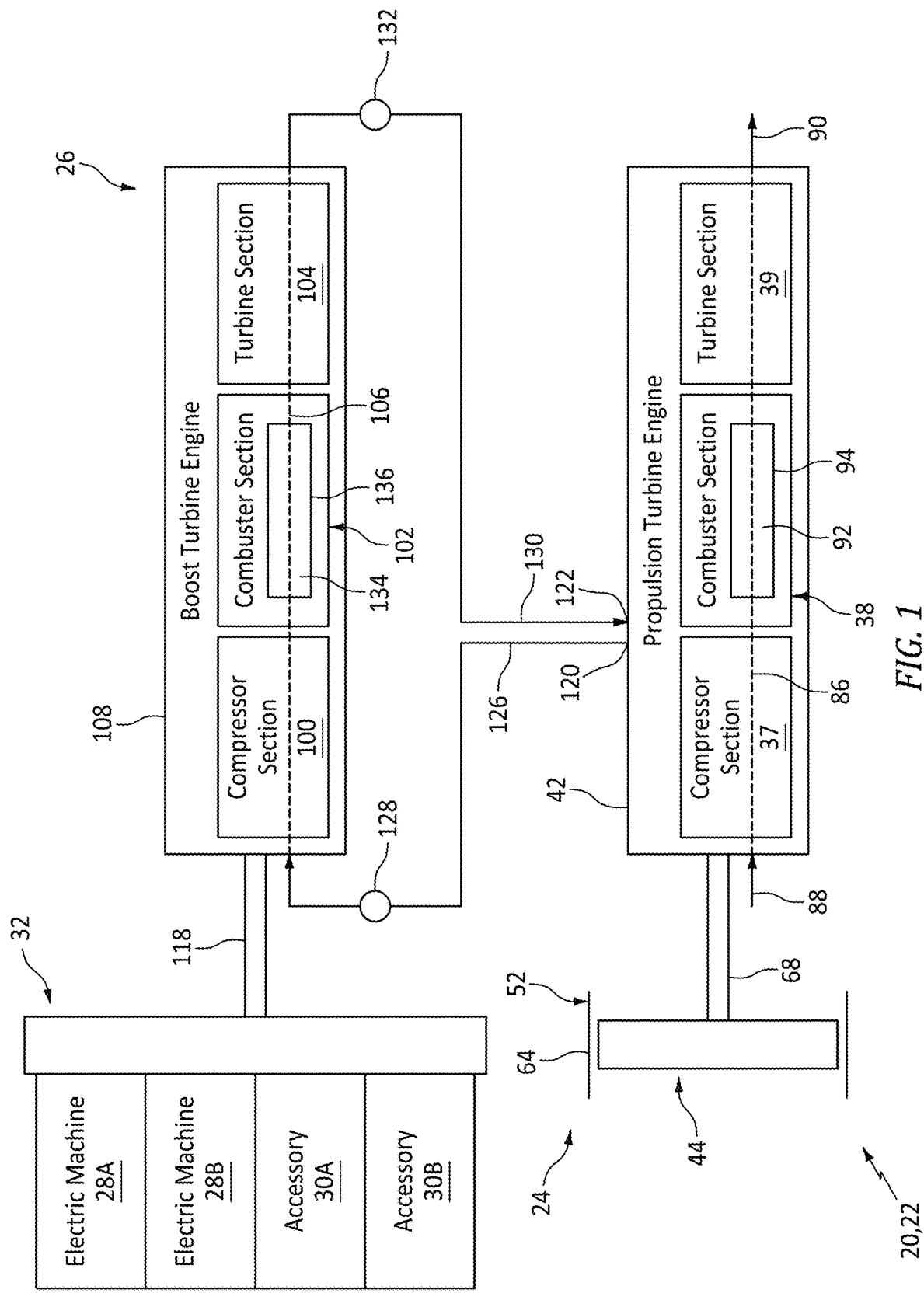
FIG. 1 is a schematic illustration of a multi-engine powerplant for an aircraft.

FIG. 1 illustrates a multi-engine powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. The aircraft powerplant 20 may be configured as, or otherwise included as part of, a propulsion system 22 for the aircraft. For ease of description, this aircraft propulsion system 22 is described below as a ducted rotor propulsion system such as a turbofan propulsion system. The present disclosure, however, is not limited to such an exemplary aircraft propulsion system. The aircraft propulsion system 22, for example, may alternatively be configured as a turbojet propulsion system, a turboprop propulsion system, a propfan propulsion system, a pusher fan propulsion system, a rotorcraft propulsion and/or lift system, or any other aircraft propulsion system with one or more ducted and/or open (e.g., un-ducted) propulsor rotors. The aircraft powerplant 20 of FIG. 1 may also (or alternatively) be configured as, or otherwise included as part of, an electrical power system for the aircraft.

The aircraft powerplant 20 of FIG. 1 includes a propulsion turbine engine 24, a boost turbine engine 26 and an accessory system for the aircraft powerplant 20. The accessory system may include one or more electric machines 28A and 28B (generally referred to as "28") and/or one or more accessories 30A and 30B (generally referred to as "30") for the aircraft powerplant 20 and one or more of its turbine engines 24 and 26. The aircraft powerplant 20 also includes an inter-component drivetrain 32 configured to operatively couple the powerplant members 24, 26, 28 and/or 30 together (see also FIG. 4).

Figure 2:
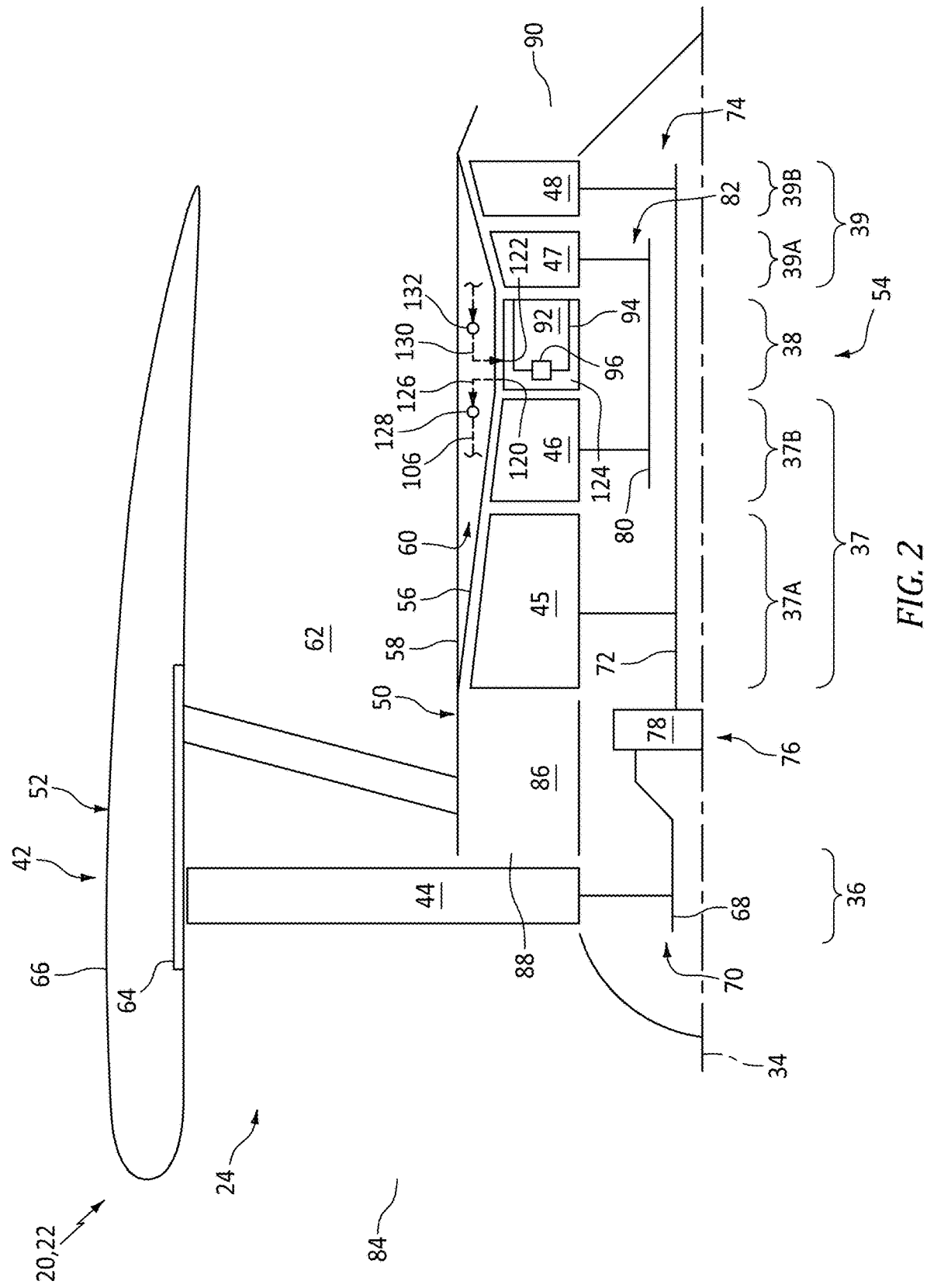
FIG. 2 is a partial schematic illustration of a propulsion turbine engine within an engine housing.

Referring to FIG. 2, the propulsion turbine engine 24 extends axially along a propulsion engine axis 34 between an axial forward, upstream end of the propulsion turbine engine 24 and an axial aft, downstream end of the propulsion turbine engine 24. Briefly, the propulsion engine axis 34 may be a centerline axis of the propulsion turbine engine 24 and/or one or more of its members. The propulsion engine axis 34 may also or alternatively be a rotational axis for one or more members of the propulsion turbine engine 24. The propulsion turbine engine 24 may be configured as a turbofan engine. The propulsion turbine engine 24 of FIG. 2, for example, includes a propulsion engine propulsor section 36 (e.g., a fan section), a propulsion engine compressor section 37, a propulsion engine combustor section 38 and a propulsion engine turbine section 39. The propulsion engine compressor section 37 of FIG. 2 includes a low pressure compressor (LPC) section 37A and a high pressure compressor (HPC) section 37B. The propulsion engine turbine section 39 of FIG. 2 includes a high pressure turbine (HPT) section 39A and a low pressure turbine (LPT) section 39B.

The propulsion engine sections 36-39B may be arranged sequentially along the propulsion engine axis 34 within a stationary engine housing 42 for the aircraft powerplant 20. The propulsion engine propulsor section 36 includes a bladed propulsor rotor 44; e.g., a fan rotor. The LPC section 37A includes a bladed low pressure compressor (LPC) rotor 45. The HPC section 37B includes a bladed high pressure compressor (HPC) rotor 46. The HPT section 39A includes a bladed high pressure turbine (HPT) rotor 47. The LPT section 39B includes a bladed low pressure turbine (LPT) rotor 48. These propulsion engine rotors 44-48 are housed within the engine housing 42. The engine housing 42 of FIG. 2, for example, includes an inner housing structure 50 and an outer housing structure 52. Here, at least (or only) the LPC section 37A, the HPC section 37B, the propulsion engine combustor section 38, the HPT section 39A and the LPT section 39B collectively form a core 54 (e.g., a gas generator) of the propulsion turbine engine 24.

The inner housing structure 50 of FIG. 2 includes an inner engine case 56 for the propulsion turbine engine 24, an inner nacelle structure 58 (sometimes referred to as an inner fixed structure (IFS)) and an internal housing compartment 60. The inner engine case 56 is disposed radially outboard of, extends axially along and may circumscribe one or more or all of the propulsion engine sections 37A-39B and their respective propulsion engine rotors 45-48. The inner engine case 56 may thereby house and provide a support structure for the propulsion engine sections 37A-39B and the propulsion engine rotors 45-48. The inner nacelle structure 58 is configured to provide an aerodynamic cover over the engine core 54 and its inner engine case 56. The housing compartment 60 of FIG. 2 is formed by and is disposed radially between the inner engine case 56 and an inner barrel of the inner nacelle structure 58. The inner housing structure 50 and its inner nacelle structure 58 may also form a radial inner peripheral boundary of a bypass flowpath 62 (e.g., annular bypass flowpath) within the aircraft powerplant 20.

The outer housing structure 52 of FIG. 2 includes an outer engine case 64 (e.g., a fan case) for the propulsion turbine engine 24, and an outer nacelle structure 66. The outer engine case 64 is disposed radially outboard of, extends axially along and may circumscribe the propulsion engine propulsor section 36 and its propulsor rotor 44. The outer engine case 64 may thereby house and provide a containment structure for the propulsion engine propulsor section 36 and its propulsor rotor 44. The outer nacelle structure 66 is configured to provide an aerodynamic cover over the outer engine case 64. The outer housing structure 52 and its outer nacelle structure 66 may also form a radial outer peripheral boundary of the bypass flowpath 62.

The propulsor rotor 44 of FIG. 2 is connected to and rotatable with a propulsor shaft 68; e.g., a fan shaft. At least (or only) the propulsor rotor 44 and the propulsor shaft 68 collectively form a propulsor rotating structure 70. This propulsor rotating structure 70 of FIG. 2 and its members 44 and 68 are rotatable about the propulsion engine axis 34.

The LPC rotor 45 is coupled to and rotatable with the LPT rotor 48. The LPC rotor 45 of FIG. 2, for example, is connected to the LPT rotor 48 through a low speed shaft 72. At least (or only) the LPC rotor 45, the LPT rotor 48 and the low speed shaft 72 collectively form a low speed rotating structure 74; e.g., a low speed spool of the propulsion turbine engine 24 and its engine core 54. This low speed rotating structure 74 of FIG. 2 and its members 45, 48 and 72 are rotatable about the propulsion engine axis 34; however, it is contemplated the low speed rotating structure 74 may alternatively be rotatable about another axis radially and/or angularly offset from the propulsion engine axis 34. The low speed rotating structure 74 of FIG. 2 is also coupled to the propulsor rotating structure 70. The low speed rotating structure 74 of FIG. 2, for example, is connected to the propulsor rotating structure 70 through a drivetrain 76. This drivetrain 76 may be configured as a geared drivetrain, where a geartrain 78 (e.g., a transmission, a speed change device, an epicyclic geartrain, etc.) is disposed between and operatively couples the propulsor rotating structure 70 and its propulsor rotor 44 to the low speed rotating structure 74 and its LPT rotor 48. With this arrangement, the propulsor rotor 44 may rotate at a different (e.g., slower) rotational speed than the low speed rotating structure 74 and its LPT rotor 48. However, the drivetrain 76 may alternatively be configured as a direct drive drivetrain, where the geartrain 78 is omitted. With such an arrangement, the propulsor rotor 44 may rotate at a common (the same) rotational speed as the low speed rotating structure 74 and its LPT rotor 48.

The HPC rotor 46 is coupled to and rotatable with the HPT rotor 47. The HPC rotor 46 of FIG. 2, for example, is connected to the HPT rotor 47 through a high speed shaft 80. At least (or only) the HPC rotor 46, the HPT rotor 47 and the high speed shaft 80 collectively form a high speed rotating structure 82; e.g., a high speed spool of the propulsion turbine engine 24 and its engine core 54. This high speed rotating structure 82 of FIG. 2 and its members 46, 47 and 80 are rotatable about the propulsion engine axis 34; however, it is contemplated the high speed rotating structure 82 may alternatively be rotatable about another axis radially and/or angularly offset from the propulsion engine axis 34.

During operation of the propulsion turbine engine 24 of FIG. 2, ambient air (e.g., air from outside of the aircraft) enters the aircraft powerplant 20 and its propulsion turbine engine 24 through an airflow inlet 84. This air is directed across the propulsor rotor 44 and into a core flowpath 86 (e.g., an annular core flowpath) and the bypass flowpath 62. The core flowpath 86 of FIG. 2 extends sequentially through the LPC section 37A, the HPC section 37B, the propulsion engine combustor section 38, the HPT section 39A and the LPT section 39B from an airflow inlet 88 into the core flowpath 86 to a combustion products exhaust 90 out from the core flowpath 86. Here, the core exhaust 90 may also be configured as a combustion products exhaust from the propulsion turbine engine 24 and, more generally, the aircraft powerplant 20. The air entering the core flowpath 86 may be referred to as "core air". The bypass flowpath 62 of FIG. 2 extends through a bypass duct. This bypass flowpath 62 and its bypass duct bypass (e.g., are disposed radially outboard of and extend along) the engine core 54. The air entering the bypass flowpath 62 may be referred to as "bypass air".

The core air is compressed by the LPC rotor 45 and the HPC rotor 46 and is directed into a combustion chamber 92 (e.g., an annular combustion chamber) of a combustor 94 (e.g., an annular combustor) in the propulsion engine combustor section 38. Fuel is injected into the combustion chamber 92 by one or more propulsion engine fuel injectors 96 and mixed with the compressed core air to provide a fuel-air mixture. This fuel-air mixture is ignited and combustion products thereof flow through and sequentially drive rotation of the HPT rotor 47 and the LPT rotor 48 about the propulsion engine axis 34. The rotation of the HPT rotor 47 and the LPT rotor 48 respectively drive rotation of the HPC rotor 46 and the LPC rotor 45 about the propulsion engine axis 34 and, thus, compression of the air received from the core inlet 88. The rotation of the LPT rotor 48 also drives rotation of the propulsor rotor 44 about the propulsion engine axis 34. The rotation of the propulsor rotor 44 propels the bypass air through and out of the bypass flowpath 62. The propulsion of the bypass air may account for a majority of thrust generated by the aircraft powerplant 20 and its propulsion turbine engine 24.

Figure 3:
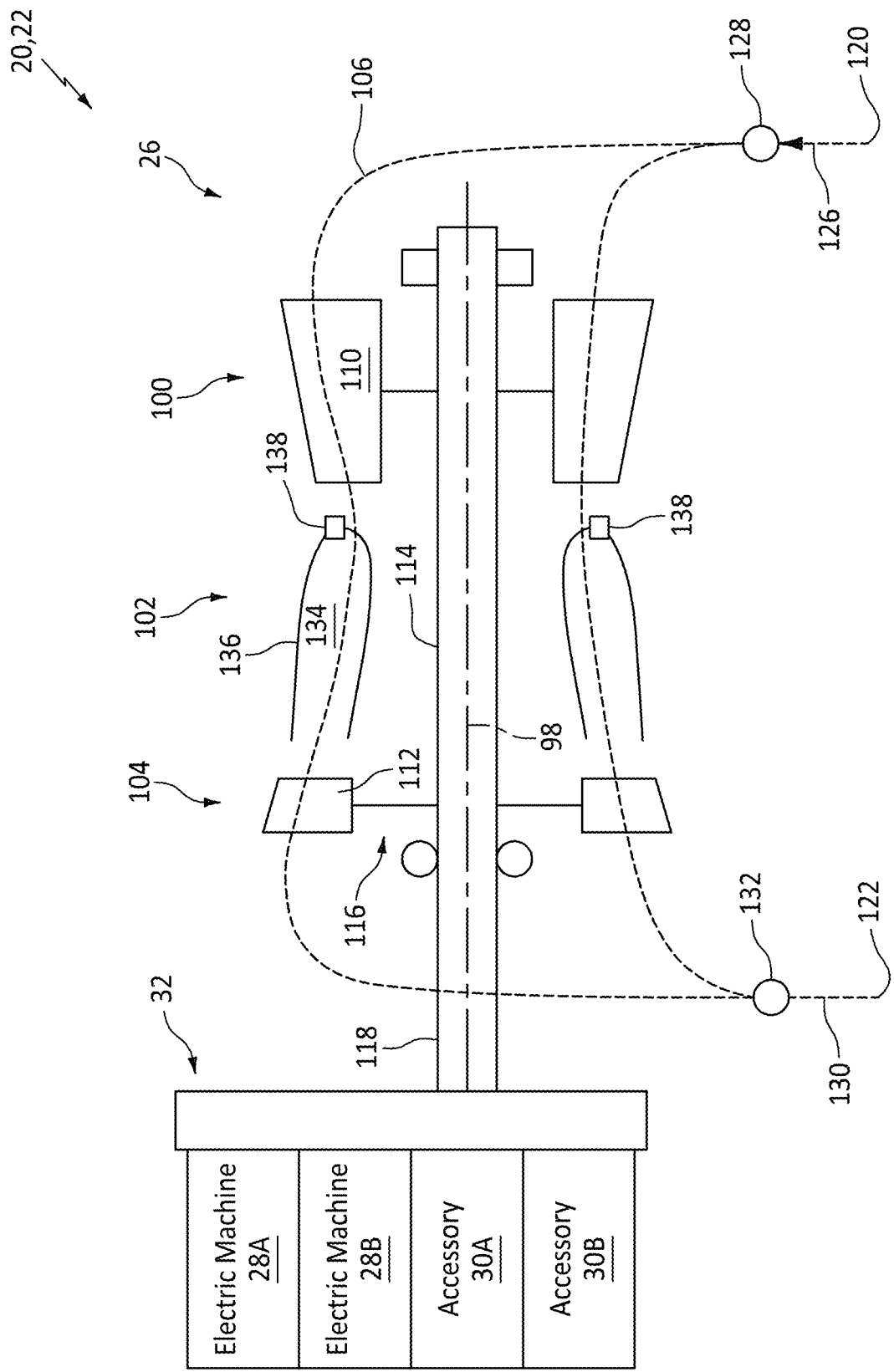
FIG. 3 is a partial schematic illustration of a boost turbine engine with an accessory system.

Referring to FIG. 3, the boost turbine engine 26 extends axially along a boost engine axis 98 between an axial forward, upstream end of the boost turbine engine 26 and an axial aft, downstream end of the boost turbine engine 26; however, it is contemplated the arrangement of the boost turbine engine 26 may be reversed with respect to its forward and aft ends. Briefly, the boost engine axis 98 may be a centerline axis of the boost turbine engine 26 and/or one or more of its members. The boost engine axis 98 may also or alternatively be a rotational axis for one or more members of the boost turbine engine 26. The boost turbine engine 26 may be configured as a turboshaft engine. The boost turbine engine 26 of FIG. 1, for example, includes a boost engine compressor section 100, a boost engine combustor section 102 and a boost engine turbine section 104. This boost turbine engine 26 also includes a boost engine flowpath 106.

The boost engine sections 100, 102 and 104 may be arranged sequentially along the boost engine axis 98 within a boost engine housing 108 (see FIG. 1); e.g., a case. The boost engine compressor section 100 includes a bladed compressor rotor 110. The boost engine turbine section 104 includes a bladed turbine rotor 112. These boost engine rotors 110 and 112 are housed within the boost engine housing 108 of FIG. 1. The boost engine housing 108 of FIG. 1, for example, is disposed radially outboard of, extends axially along and may circumscribe one or more or all of the boost engine sections 100, 102 and 104 and the boost engine rotors 110 and 112 of FIG. 3.

The compressor rotor 110 of FIG. 3 is coupled to and rotatable with the turbine rotor 112. The compressor rotor 110 of FIG. 3, for example, is connected to the turbine rotor 112 through a boost engine shaft 114. At least (or only) the compressor rotor 110, the turbine rotor 112 and the engine shaft 114 collectively form a boost engine rotating structure 116. This engine rotating structure 116 of FIG. 3 and its members 110, 112 and 114 are rotatable about the boost engine axis 98. The engine rotating structure 116 may be coupled to (or, the engine rotating structure 116 may also include) an engine mechanical drive 118; e.g., a driveshaft, a drive coupling, etc.

The engine flowpath 106 of FIG. 3 extends sequentially through the boost engine compressor section 100, the boost engine combustor section 102 and the boost engine turbine section 104 from an airflow inlet 120 into the engine flowpath 106 to a combustion products outlet 122 out from the engine flowpath 106. Here, the flowpath inlet 120 may also be an airflow inlet into the boost turbine engine 26. Similarly, the flowpath outlet 122 may also be a combustion products exhaust from the boost turbine engine 26.

Referring to FIG. 2, the flowpath inlet 120 is fluidly coupled with the propulsion turbine engine 24 and its core flowpath 86. The flowpath inlet 120 is configured as or otherwise includes at least one bleed (e.g., an orifice, a scoop, etc.) along the core flowpath 86. The flowpath inlet 120 is thereby configured to receive (e.g., bleed) the core air from the core flowpath 86, for example upstream of the propulsion engine combustor 94 and its propulsion engine combustion chamber 92. More particularly, the flowpath inlet 120 of FIG. 2 is formed by and/or in a component (e.g., a flowpath wall, a vane arrangement, etc.) in the propulsion turbine engine 24. The flowpath inlet 120 may be located in/along the propulsion engine compressor section 37 and, more particularly, the HPC section 37B. Alternatively, the flowpath inlet 120 may be located in/along the propulsion engine combustor section 38. The flowpath inlet 120 of FIG. 2, for example, is located at (e.g., on, adjacent or proximate) a diffuser between the HPC section 37B and a plenum 124 surrounding the propulsion engine combustor 94. Referring to FIG. 1, the flowpath inlet 120 is fluidly coupled to the boost engine compressor section 100 through an inlet duct 126. The inlet duct 126 (or the flowpath inlet 120) may be configured with a flowpath regulator 128 (e.g., a valve, a valve system, a flow diverter, etc.) for regulating the flow of the core air diverted out of (e.g., bled from) the core flowpath 86 to the boost turbine engine 26 and its engine flowpath 106.

Referring to FIG. 2, the flowpath outlet 122 is fluidly coupled with the propulsion turbine engine 24 and its core flowpath 86. This flowpath outlet 122 is configured to direct exhaust (e.g., combustion products) from the boost turbine engine 26 into the core flowpath 86, for example upstream of the propulsion engine combustor 94 and its propulsion engine combustion chamber 92 and/or downstream of the flowpath inlet 120. The flowpath outlet 122 of FIG. 2, for example, is formed by and/or in a component (e.g., a flowpath wall, a vane arrangement, etc.) in the propulsion turbine engine 24. The flowpath outlet 122 may be located in/along the propulsion engine combustor section 38. The flowpath outlet 122 of FIG. 2, for example, is located at the diffuser. Referring to FIG. 1, the flowpath outlet 122 is fluidly coupled to the propulsion engine compressor section 37 through an outlet duct 130; e.g., an exhaust duct. The outlet duct 130 (or the flowpath outlet 122) may be configured with a flowpath regulator 132 (e.g., a valve, a valve system, a flow diverter, etc.) for regulating the flow of the gas exhausted out from the boost turbine engine 26 and directed into the propulsion turbine engine 24.

During operation of the boost turbine engine 26 of FIGS. 1 and 2, a flow of the compressed core air is bled from the propulsion turbine engine 24 and its core flowpath 86 via the flowpath inlet 120 and directed into the engine flowpath 106. This bleed air directed into the engine flowpath 106 of FIG. 3 may be referred to as "boost engine core air".

Referring to FIG. 3, the boost engine core air is compressed by the compressor rotor 110 and is directed into a combustion chamber 134 (e.g., an annular combustion chamber) of a combustor 136 (e.g., an annular combustor) in the boost engine combustor section 102. Fuel is injected into the boost engine combustion chamber 134 by one or more boost engine fuel injectors 138 and mixed with the compressed boost engine core air to provide a fuel-air mixture. This fuel-air mixture is ignited and combustion products thereof flow through and drive rotation of the turbine rotor 112 about the boost engine axis 98. The rotation of the turbine rotor 112 drives rotation of the compressor rotor 110 about the boost engine axis 98 and, thus, compression of the core air received from the flowpath inlet 120.

Referring to FIG. 1, an overall pressure ratio (OPR) of the propulsion turbine engine 24 may increase as the thrust generated by the propulsion turbine engine 24 and its propulsor rotor 44 increases. Conversely, the overall pressure ratio of the propulsion turbine engine 24 may decrease as the thrust generated by the propulsion turbine engine 24 and its propulsor rotor 44 decreases. A pressure of the core air directed into the engine flowpath 106 through the flowpath inlet 120 therefore is (a) relatively low when the thrust generated by the propulsion turbine engine 24 and its propulsor rotor 44 is relatively low and (b) relatively high when the thrust generated by the propulsion turbine engine 24 and its propulsor rotor 44 is relatively high. The boost turbine engine 26 therefore may work more when the pressure of the bled core air is relatively low/the thrust generated by the propulsion turbine engine 24 and its propulsor rotor 44 is relatively low. Conversely, the boost turbine engine 26 may work less when the pressure of the bled core air is relatively high/the thrust generated by the propulsion turbine engine 24 and its propulsor rotor 44 is relatively high. The boost turbine engine 26 and its engine rotating structure 116 thereby operate with a relatively high pressure ratio (PR) at relatively low thrust and with a relatively low pressure ratio at relatively high thrust. This back and forth may reduce the swing in temperature of the boost engine core air at a location along the engine flowpath 106 between the boost engine compressor section 100 and the boost engine combustor 136 (see FIG. 3).

Figure 4:
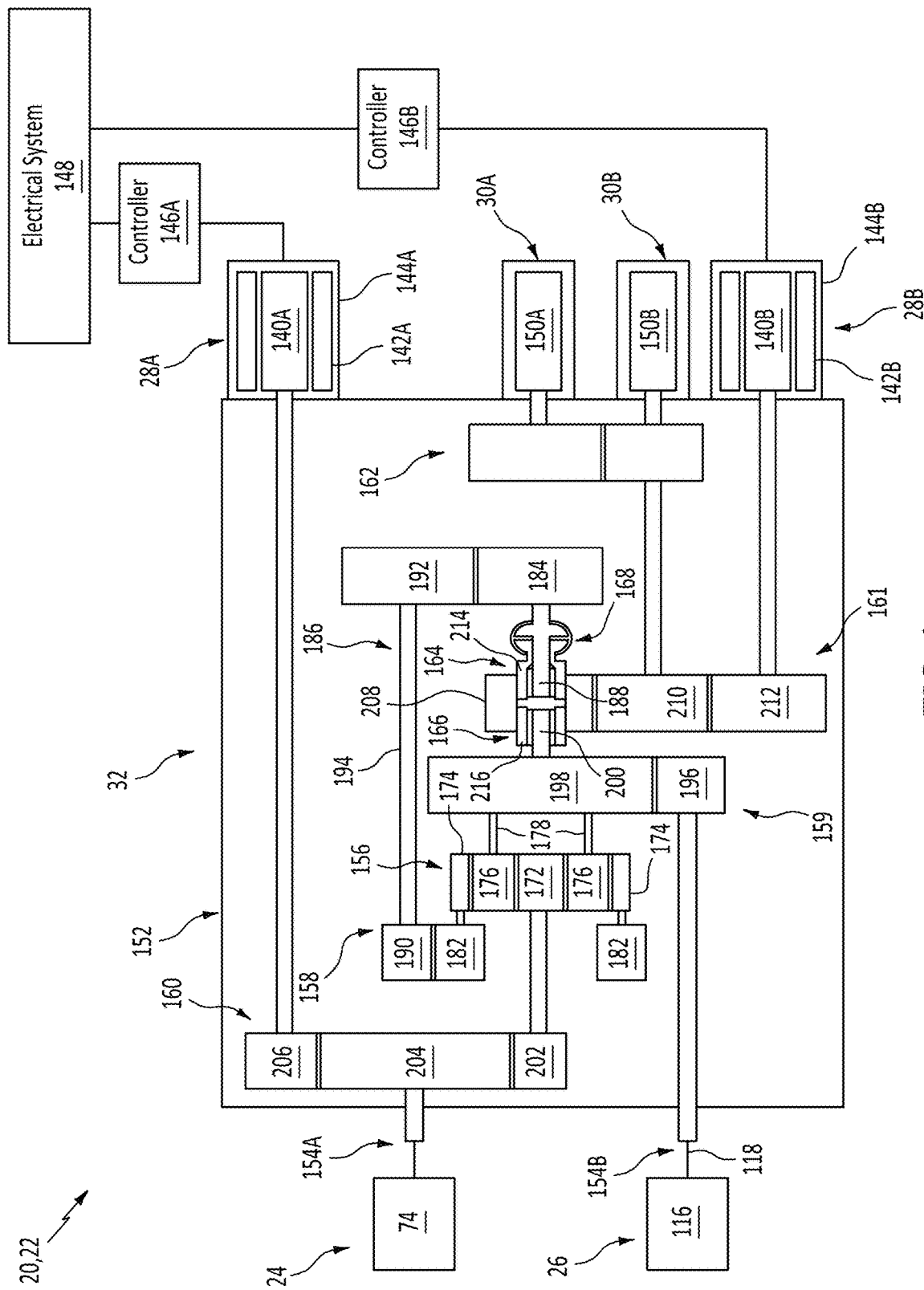
FIG. 4 is a partial schematic illustration of the multi-engine powerplant at an inter-component drivetrain.

Referring to FIG. 4, each electric machine 28A, 28B includes an electric machine rotor 140A, 140B (generally referred to as "140"), an electric machine stator 142A, 142B (generally referred to as "142") and an electric machine housing 144A, 144B (generally referred to as "144"); e.g., a case. The machine rotor 140 is operably coupled to the inter-component drivetrain 32. The machine rotor 140 is rotatable about a rotational axis of the machine rotor 140, which rotational axis may also be an axial centerline of the electric machine 28. The machine stator 142 of FIG. 4 is radially outboard of and circumscribes the machine rotor 140. With this arrangement, each electric machine 28 is configured as a radial flux electric machine. The electric machines 28 of the present disclosure, however, are not limited to such an exemplary rotor-stator configuration nor to radial flux arrangements. The machine rotor 140, for example, may alternatively be radially outboard of and circumscribe the machine stator 142. In another example, the machine rotor 140 may be axially next to the machine stator 142 configuring the respective electric machine 28 as an axial flux electric machine. Referring again to FIG. 4, the machine rotor 140 and the machine stator 142 are at least partially or completely housed within an interior of the machine housing 144.

Each electric machine 28A, 28B may be associated with its own dedicated electric machine (EM) controller 146A, 146B (generally referred to as "146"). This EM controller 146 is configured to electrically couple the respective electric machine 28 to an electrical system 148 for the aircraft powerplant 20, or more generally, for the aircraft. The EM controller 146 is also configured to control operation of the respective electric machine 28. The EM controller 146, for example, may regulate a flow of electricity between the respective electric machine 28 and the electrical system 148. More particularly, the EM controller 146 may (a) electrically couple the respective electric machine 28 and the electrical system 148, (b) electrically uncouple the respective electric machine 28 from the electrical system 148, and/or (c) meter the flow of the flow of electricity between the respective electric machine 28 and the electrical system 148 to an intermediate rate. The present disclosure, however, is not limited to such an exemplary arrangement. For example, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines. The electrical system 148 and/or each EM controller 146 may include functions to filter, invert, rectify, and otherwise manage voltage, frequency, and current provided to and/or received from the respective electric machine 28.

Each electric machine 28 of FIG. 4 may be configurable as an electric motor and/or an electric generator; e.g., an electric motor-generator. For example, during a motor mode of operation, a respective one of the electric machines 28 may operate as the electric motor to convert electricity received from the electrical system 148 into mechanical power. The machine stator 142, for example, may generate an electromagnetic field with the machine rotor 140 using a current of electricity received from the electrical system 148 through the respective EM controller 146. This electromagnetic field may drive rotation of the machine rotor 140. The machine rotor 140, in turn, may provide mechanical power to one or more other members of the aircraft powerplant 20 through the inter-component drivetrain 32. This mechanical power may be provided to boost power provided to the one or more other aircraft powerplant members. Alternatively, the mechanical power may be provided to completely power operation of the one or more other aircraft powerplant members. By contrast, during a generator mode of operation, the respective electric machine 28 may operate as the electric generator to convert mechanical power received from one or more other members of the aircraft powerplant 20 through the inter-component drivetrain 32 into electricity. Rotation of the machine rotor 140, for example, may be rotationally driven by the received mechanical power. The rotation of the machine rotor 140 may generate an electromagnetic field with the machine stator 142, and the machine stator 142 may convert energy from the electromagnetic field into electricity. The respective electric machine 28 may then provide a current of electricity to the electrical system 148 through the respective EM controller 146 for storage and/or further use. The electric machines 28 of the present disclosure, however, are not limited to such exemplary operation. For example, one or more of the electric machines 28 may alternatively each be configured as a dedicated electric generator; e.g., without the electric motor functionality. In another example, one or more of the electric machines 28 may alternatively each be configured as a dedicated electric motor; e.g., without the electric generator functionality.

Each powerplant accessory 30A, 30B includes an accessory rotor 150A, 150B (generally referred to as "150"). This accessory rotor 150 is operably coupled to the inter-component drivetrain 32. The accessory rotor 150 is rotatable about a rotational axis of the powerplant accessory 30, which rotational axis may also be an axial centerline of the powerplant accessory 30. Examples of the powerplant accessories 30 include a fluid pump (e.g., a fuel pump, a lubricant pump, a coolant pump and/or an actuation fluid pump such as a hydraulic pump), a deaerator, an auxiliary air compressor (e.g., a compressor for a cabin environmental system), an electrical generator, and the like. The present disclosure, of course, is not limited to the foregoing exemplary powerplant accessories.

The inter-component drivetrain 32 may be configured as or otherwise include a transmission selectively operatively coupling the propulsion turbine engine 24, the boost turbine engine 26, the electric machines 28 and/or the powerplant accessories 30 together. The inter-component drivetrain 32 of FIG. 4, for example, includes a powerplant gearbox 152 (e.g., an accessory gearbox for the propulsion turbine engine 24) and one or more engine-to-gearbox drivetrains 154A and 154B (generally referred to as "154"). Briefly, each engine-to-gearbox drivetrain 154 may be configured as or otherwise include a shaft, a tower shaft assembly, an accessory gearbox, an angle gearbox, and/or the like. Of course, in other embodiments, it is contemplated a direct coupling may be provided between the powerplant gearbox 152 and one or both of the turbine engines 24 and 26 such that the respective engine-to-gearbox drivetrain(s) 154 is/are omitted. The powerplant gearbox 152 of FIG. 4 includes a differential geartrain 156, one or more gear systems 158-162 and one or more clutches 164 and 166. The powerplant gearbox 152 may (or may not) also include a fluid clutch 168.

Figure 5:
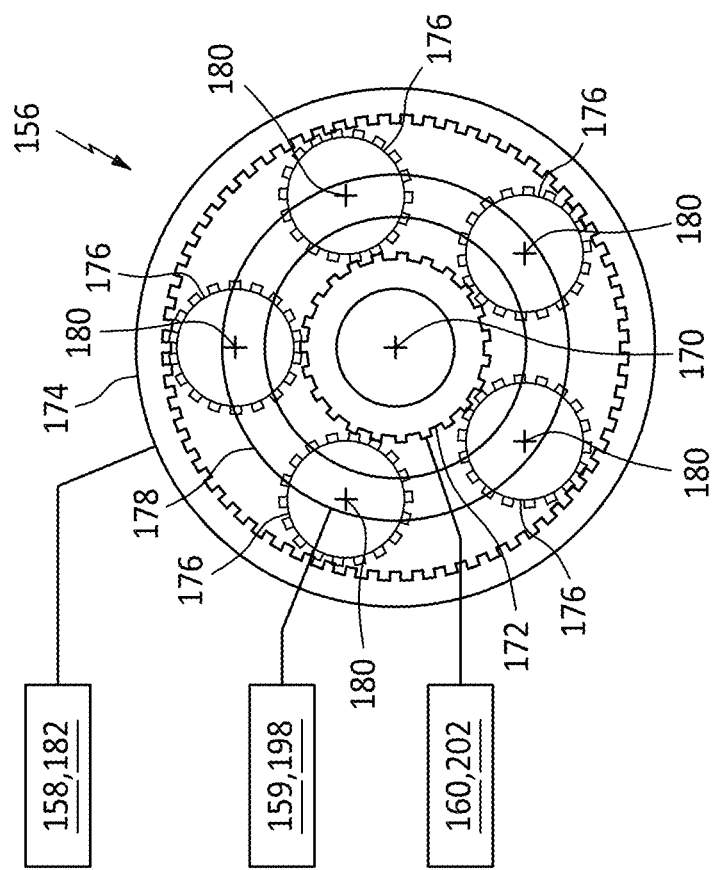
FIG. 5 is a partial schematic illustration of the inter-component drivetrain at a differential drivetrain.

Referring to FIG. 5, the differential geartrain 156 may be configured as or otherwise include an epicyclic geartrain. The differential geartrain 156 of FIG. 5, for example, includes an axis 170, a sun gear 172, a ring gear 174, a plurality of intermediate gears 176 and a carrier 178. The geartrain axis 170 may be a rotational axis and/or a centerline axis of the differential geartrain 156 and its members 172, 174 and 178. The sun gear 172 is rotatable about the geartrain axis 170. The ring gear 174 is rotatable about the geartrain axis 170. The ring gear 174 is spaced radially outboard of the sun gear 172 and circumscribes the sun gear 172 as well as an array of the intermediate gears 176. The intermediate gears 176 are arranged circumferentially about the sun gear 172 and the geartrain axis 170 in the array; e.g., an annular array. Each of these intermediate gears 176 is radially between and engaged (e.g., meshed) with the sun gear 172 and the ring gear 174. Each of the intermediate gears 176 is rotatably mounted to the carrier 178 such that each intermediate gear 176 is rotatable about a respective rotational axis 180 that may be parallel to the geartrain axis 170. The carrier 178 is rotatable about the geartrain axis 170.

Referring to FIG. 4, the first gear system 158 is configured to operatively couple the differential geartrain 156 and the first clutch 164 together. The first gear system 158 of FIG. 4, for example, includes a first I/O gear 182 (e.g., a drive and/or driven gear), a second I/O gear 184 (e.g., a drive and/or driven gear) and a gear coupler 186. The first I/O gear 182 is connected to and rotatable with the ring gear 174. The second I/O gear 184 is connected to and rotatable with an inner member 188 (e.g., a shaft or other rotor) of the first clutch 164. The gear coupler 186 of FIG. 4 includes a first idler gear 190, a second idler gear 192 and a shaft 194 extending between and rotationally connecting the first idler gear 190 and the second idler gear 192. The first idler gear 190 is engaged (e.g., meshed) with the first I/O gear 182. The second idler gear 192 is engaged (e.g., meshed) with the second I/O gear 184.

The second gear system 159 is configured to operatively couple the differential geartrain 156, the boost turbine engine 26 (e.g., via the boost engine-to-gearbox drivetrain 154B) and the second clutch 166 together. The second gear system 159 of FIG. 4, for example, includes a first I/O gear 196 (e.g., a drive and/or driven gear) and a second I/O gear 198 (e.g., a drive and/or driven gear). The first I/O gear 196 is connected to and rotatable with the engine rotating structure 116 through the boost engine-to-gearbox drivetrain 154B. The second I/O gear 198 is connected to and rotatable with each of the carrier 178 and an inner member 200 (e.g., a shaft or other rotor) of the second clutch 166. The second I/O gear 198 is engaged (e.g., meshed) with the first I/O gear 196. With this arrangement, the boost turbine engine 26 and its engine rotating structure 116 are operatively coupled to the differential geartrain 156 and its carrier 178 independent of the second clutch 166. Similarly, the boost turbine engine 26 and its engine rotating structure 116 are operatively coupled the second clutch 166 and its second clutch inner member 200 independent of the differential geartrain 156. Moreover, the differential geartrain 156 and its carrier 178 are operatively coupled to the second clutch 166 and its second clutch inner member 200 independent of the boost turbine engine 26.

The third gear system 160 is configured to operatively couple the differential geartrain 156, the propulsion turbine engine 24 (e.g., via the propulsion engine-to-gearbox drivetrain 154A) and the first electric machine 28A together. The third gear system 160 of FIG. 4, for example, includes a first I/O gear 202 (e.g., a drive and/or driven gear), a second I/O gear 204 (e.g., a drive and/or driven gear) and a third I/O gear 206 (e.g., a drive and/or driven gear). The first I/O gear 202 is connected to and rotatable with the sun gear 172. The second I/O gear 204 is connected to and rotatable with the low speed rotating structure 74 (or alternatively the high speed rotating structure 82 of FIG. 2) through the propulsion engine-to-gearbox drivetrain 154A. The second I/O gear 204 is engaged (e.g., meshed) with the first I/O gear 202. The third I/O gear 206 is connected to and rotatable with the first machine rotor 140A. The third I/O gear 206 is engaged (e.g., meshed) with the second I/O gear 204, where the second I/O gear 204 is between and engaged with the first I/O gear 202 and the third I/O gear 206. With this arrangement, the propulsion turbine engine 24 and its low speed rotating structure 74 are operatively coupled to the differential geartrain 156 and its sun gear 172 independent of the first electric machine 28A. Similarly, the propulsion turbine engine 24 and its low speed rotating structure 74 are operatively coupled to the first electric machine 28A and its first machine rotor 140A independent of the differential geartrain 156.

The fourth gear system 161 is configured to operatively couple the first clutch 164, the second clutch 166, the second electric machine 28B and the powerplant accessories 30 (e.g., via the fifth gear system 162) together. The fourth gear system 161 of FIG. 4, for example, includes a first I/O gear 208 (e.g., a drive and/or driven gear), a second I/O gear 210 (e.g., a drive and/or driven gear) and a third I/O gear 212 (e.g., a drive and/or driven gear). The first I/O gear 208 is connected to and rotatable with each of an outer member 214 (e.g., an annular hub or other rotor) of the first clutch 164 and an outer member 216 (e.g., an annular hub or other rotor) of the second clutch 166. The second I/O gear 210 is operatively coupled to and rotatable with the accessory rotors 150 through the fifth gear system 162. The second I/O gear 210 is engaged (e.g., meshed) with the first I/O gear 208. The third I/O gear 212 is connected to and rotatable with the second machine rotor 140B. The third I/O gear 212 is engaged (e.g., meshed) with the second I/O gear 210, where the second I/O gear 210 is between and engaged with the first I/O gear 208 and the third I/O gear 212. With this arrangement, the powerplant accessories 30 and their accessory rotors 150 are operatively coupled to the clutches 164 and 166 and their clutch outer members 214 and 216 independent of the second electric machine 28B. Similarly, the powerplant accessories 30 and their accessory rotors 150 are operatively coupled to the second electric machine 28B and its second machine rotor 140B independent of the clutches 164 and 166.

The first clutch 164 may be configured as a passively actuated clutch. The first clutch 164 of FIGS. 6A and 6B, for example, is configured as a sprag clutch. This first clutch 164 of FIGS. 6A and 6B includes the first clutch inner member 188, the first clutch outer member 214 and one or more first clutch sprags 218. The first clutch outer member 214 is disposed radially outboard of and radially spaced from the first clutch inner member 188. The first clutch outer member 214 extends circumferentially about (e.g., circumscribes) the first clutch inner member 188 and an array of the first clutch sprags 218. The first clutch sprags 218 are arranged circumferentially about the first clutch inner member 188 in the array; e.g., an annular array. This array of the first clutch sprags 218 is arranged within an annular gap formed by and radially between the first clutch inner member 188 and the first clutch outer member 214. Each of these first clutch sprags 218 is movable (e.g., pivotable) between an engaged position (e.g., see FIG. 6A) and a disengaged position (e.g., see FIG. 6B). Each first clutch sprag 218 may also be biased (e.g., spring biased) to move towards its engaged position.

Figure 6B:
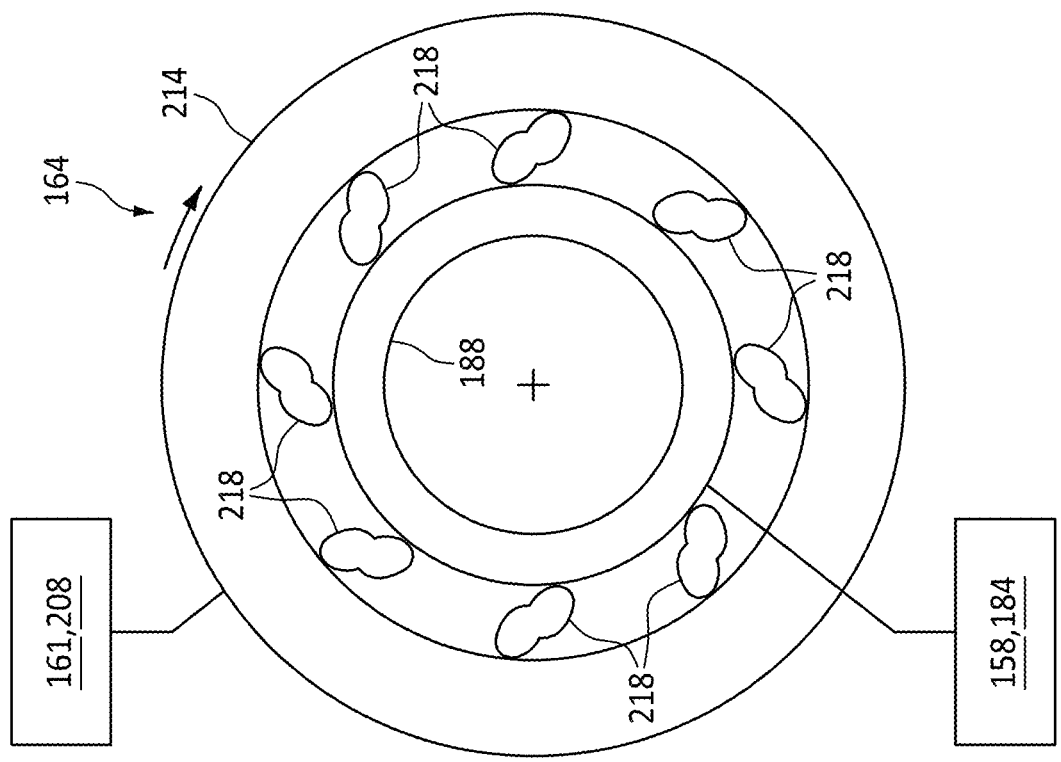
FIGS. 6A and 6B are partial schematic illustrations of the inter-component drivetrain at a first clutch in various arrangements.
Figure 6A:
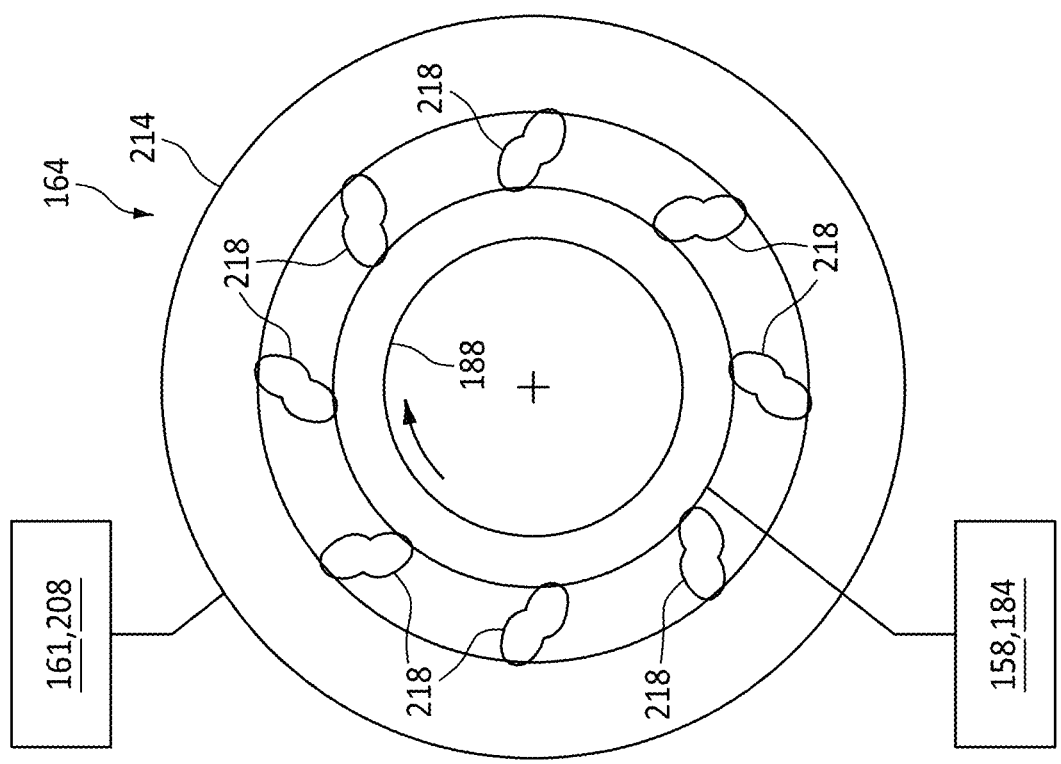

In the engaged position of FIG. 6A, each first clutch sprag 218 engages (e.g., contacts) a (e.g., cylindrical) outer surface of the first clutch inner member 188 and a (e.g., cylindrical) inner surface of the first clutch outer member 214. When the first clutch inner member 188 rotates faster than the first clutch outer member 214, the engagement between the outer surface of the first clutch inner member 188 and each first clutch sprag 218 may cause that first clutch sprag 218 to move (e.g., pivot counterclockwise in FIG. 6A) into and remain in the engaged position of FIG. 6A, where the first clutch sprags 218 are jammed between the first clutch inner member 188 and the first clutch outer member 214. These jammed first clutch sprags 218 rotationally couple/lock the first clutch inner member 188 to the first clutch outer member 214.

In the disengaged position of FIG. 6B, each first clutch sprag 218 may still engage (e.g., contact) the outer surface of the first clutch inner member 188 and the inner surface of the first clutch outer member 214; e.g., due to the spring bias. However, when the first clutch inner member 188 rotates slower than the first clutch outer member 214, the engagement between the inner surface of the first clutch outer member 214 and each first clutch sprag 218 may cause that first clutch sprag 218 to move (e.g., pivot clockwise in FIG. 6B) into and remain in the disengaged position of FIG. 6B, where the first clutch sprags 218 slide along (e.g., skip along) the outer surface of the first clutch inner member 188 and the inner surface of the first clutch outer member 214. The first clutch inner member 188 is thereby rotationally disengaged from the first clutch outer member 214.

The second clutch 166 may be configured as a passively actuated clutch. The second clutch 166 of FIGS. 7A and 7B, for example, is configured as a sprag clutch. This second clutch 166 of FIGS. 7A and 7B includes the second clutch inner member 200, the second clutch outer member 216 and one or more second clutch sprags 220. The second clutch outer member 216 is disposed radially outboard of and radially spaced from the second clutch inner member 200. The second clutch outer member 216 extends circumferentially about (e.g., circumscribes) the second clutch inner member 200 and an array of the second clutch sprags 220. The second clutch sprags 220 are arranged circumferentially about the second clutch inner member 200 in the array; e.g., an annular array. This array of the second clutch sprags 220 is arranged within an annular gap formed by and radially between the second clutch inner member 200 and the second clutch outer member 216. Each of these second clutch sprags 220 is movable (e.g., pivotable) between an engaged position (e.g., see FIG. 7A) and a disengaged position (e.g., see FIG. 7B). Each second clutch sprag 220 may also be biased (e.g., spring biased) to move towards its engaged position.

Figure 7B:
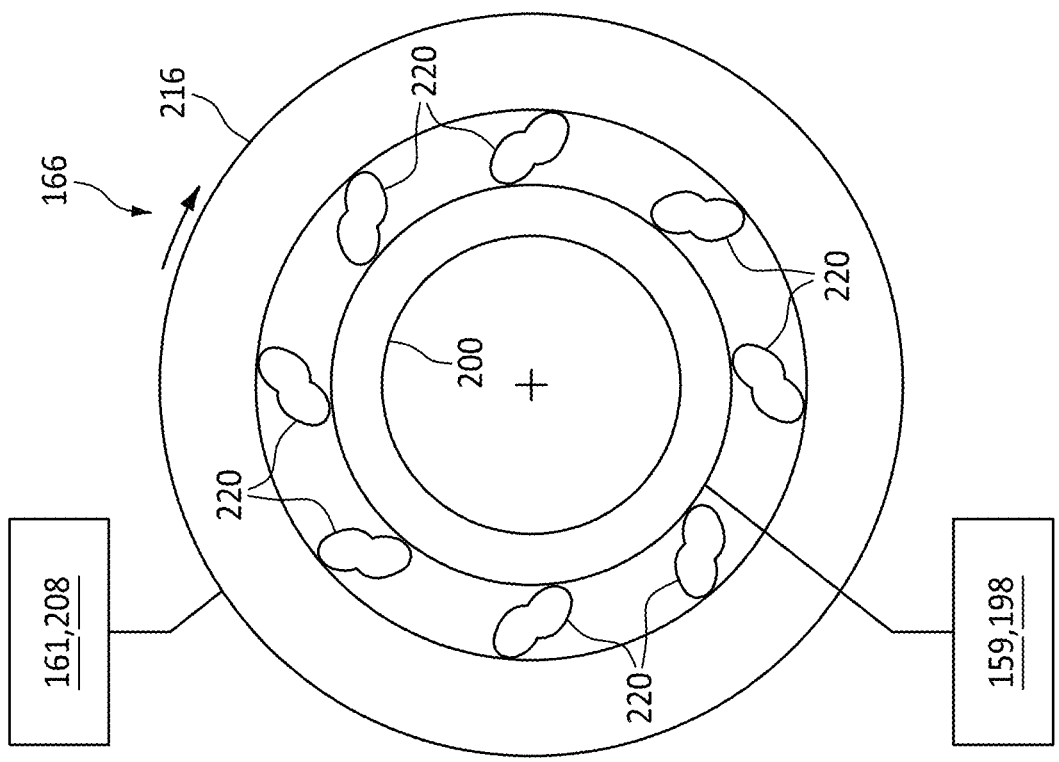
FIGS. 7A and 7B are partial schematic illustrations of the inter-component drivetrain at a second clutch in various arrangements.
Figure 7A:
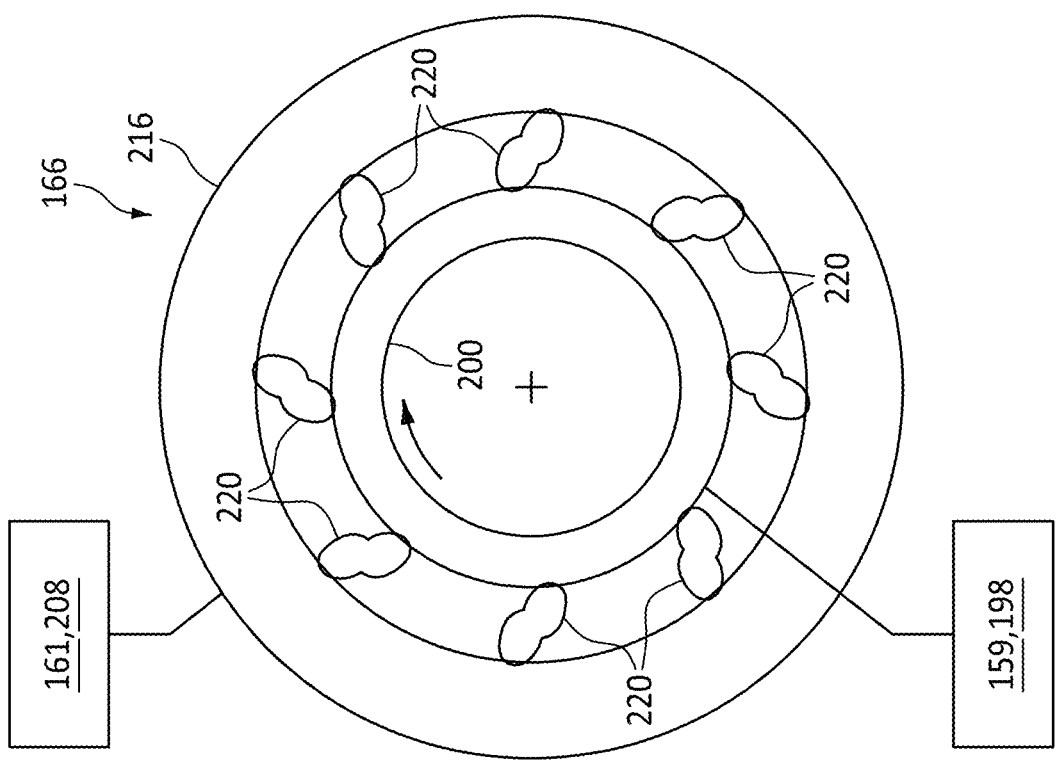

In the engaged position of FIG. 7A, each second clutch sprag 220 engages (e.g., contacts) a (e.g., cylindrical) outer surface of the second clutch inner member 200 and a (e.g., cylindrical) inner surface of the second clutch outer member 216. When the second clutch inner member 200 rotates faster than the second clutch outer member 216, the engagement between the outer surface of the second clutch inner member 200 and each second clutch sprag 220 may cause that second clutch sprag 220 to move (e.g., pivot counterclockwise in FIG. 7A) into and remain in the engaged position of FIG. 7A, where the second clutch sprags 220 are jammed between the second clutch inner member 200 and the second clutch outer member 216. These jammed second clutch sprags 220 rotationally couple/lock the second clutch inner member 200 to the second clutch outer member 216.

In the disengaged position of FIG. 7B, each second clutch sprag 220 may still engage (e.g., contact) the outer surface of the second clutch inner member 200 and the inner surface of the second clutch outer member 216; e.g., due to the spring bias. However, when the second clutch inner member 200 rotates slower than the second clutch outer member 216, the engagement between the inner surface of the second clutch outer member 216 and each second clutch sprag 220 may cause that second clutch sprag 220 to move (e.g., pivot clockwise in FIG. 7B) into and remain in the disengaged position of FIG. 7B, where the second clutch sprags 220 slide along (e.g., skip along) the outer surface of the second clutch inner member 200 and the inner surface of the second clutch outer member 216. The second clutch inner member 200 is thereby rotationally disengaged from the second clutch outer member 216.

Figure 8A:
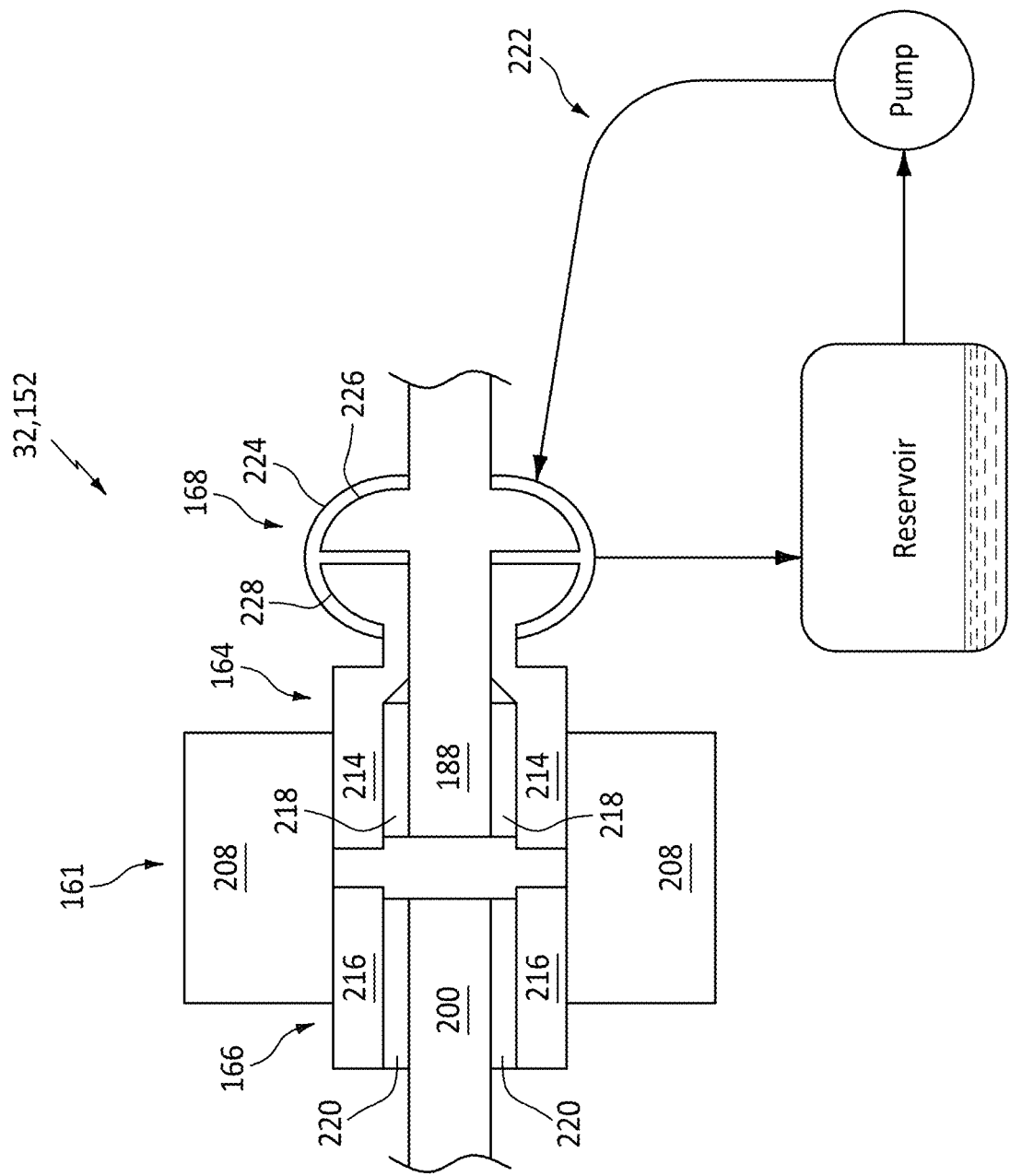
FIGS. 8A and 8B are partial schematic illustrations of the inter-component drivetrain at a fluid clutch in various arrangements.
Figure 8B:
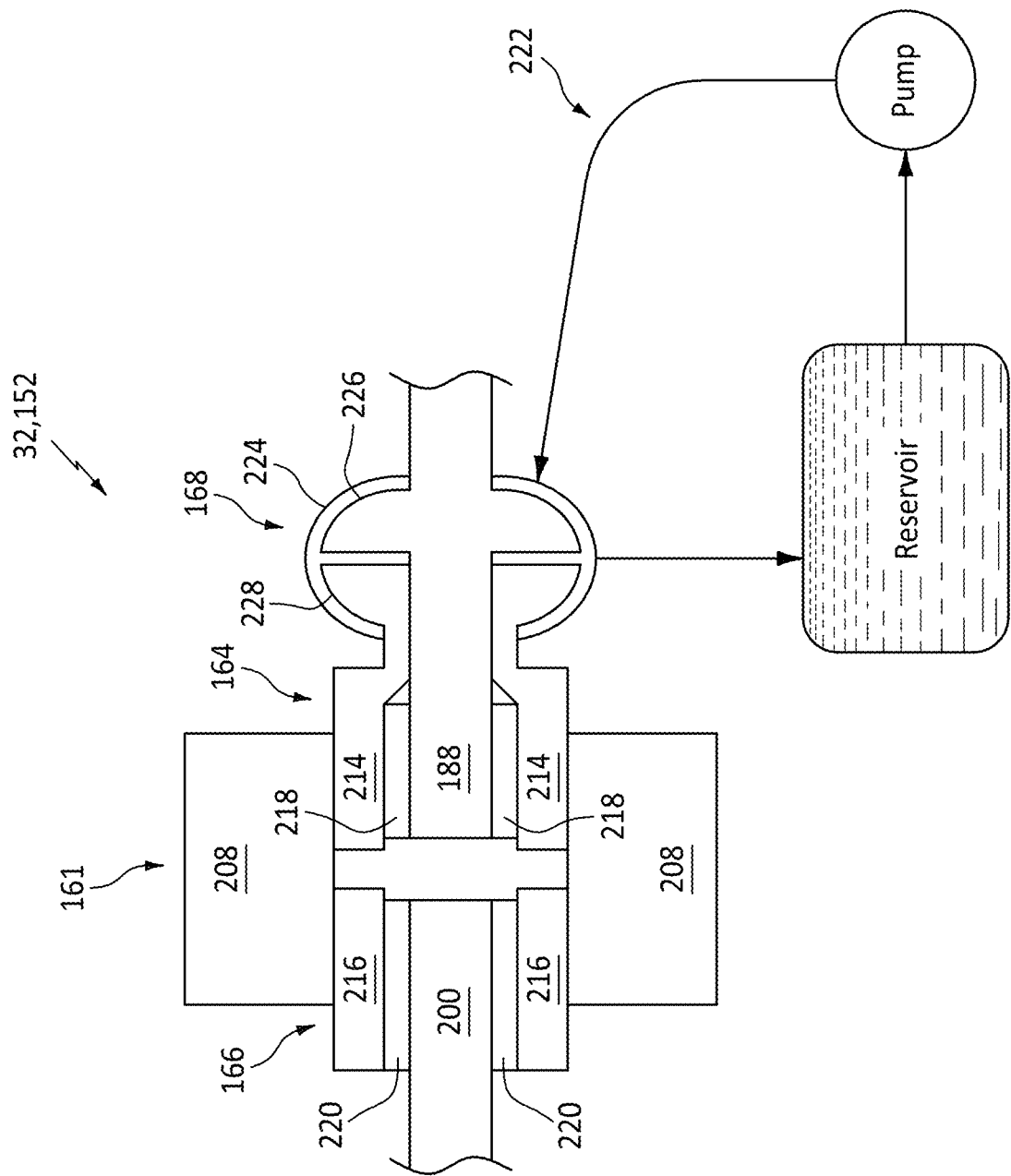

Referring to FIGS. 8A and 8B, the fluid clutch 168 includes a fluid circuit 222, a clutch housing 224 (e.g., a case) and a set of bladed fluid rotors 226 and 228 disposed within the clutch housing 224. The first fluid rotor 226 is connected to and rotatable with the second I/O gear 184 of the first gear system 158 (see FIG. 4). The second fluid rotor 228 is connected to and rotatable with the first clutch outer member 214. Referring to FIG. 8A, the fluid circuit 222 is configured to direct (e.g., pump) a working fluid (e.g., hydraulic fluid or another liquid) into an interior of the clutch housing 224 around the fluid rotors 226 and 228 to engage the fluid clutch 168. This working fluid fluidly couples the first fluid rotor 226 and the second fluid rotor 228 together. For example, rotation of the second fluid rotor 228 may drive rotation of the first fluid rotor 226 by providing an incompressible medium—the working fluid—between blades of the first fluid rotor 226 and blades of the second fluid rotor 228. By contrast, referring to FIG. 8B, the fluid circuit 222 is configured to direct (e.g., pump, drain, etc.) the working fluid from the interior of the clutch housing 224 to disengage the fluid clutch 168. When the fluid clutch 168 is disengaged, the first fluid rotor 226 may rotate independent of the second fluid rotor 228.

The inter-component drivetrain 32 and its powerplant gearbox 152 of FIG. 4 may operate in various modes of operation to transfer mechanical power to various members of the aircraft powerplant 20. These operating modes may include, but are not limited to, a first boost engine mode (e.g., see FIG. 9A), a second boost engine mode (e.g., see FIG. 9B), a hybrid-electric mode (e.g., see FIG. 9C) and/or a start mode (e.g., see FIG. 9D).

Figure 9A:
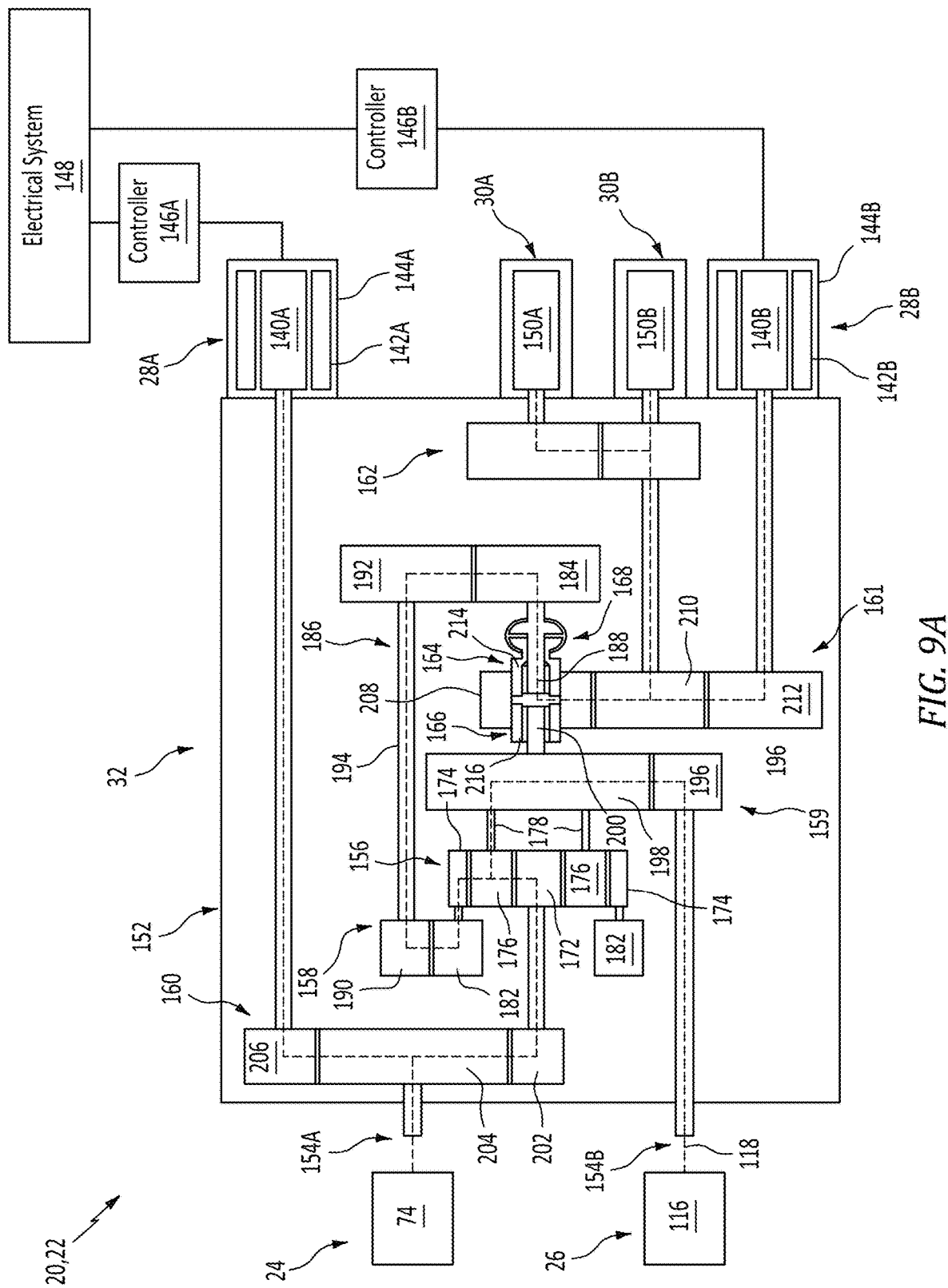
FIGS. 9A-D are partial schematic illustrations of the multi-engine powerplant at the inter-component drivetrain with various arrangements.

During the first boost engine mode of FIG. 9A, the boost turbine engine 26 may be operated to boost (or completely power) operation of one or more of the aircraft powerplant members 24, 28B, 30A and 30B. The inter-component drivetrain 32 may transfer mechanical power from the engine rotating structure 116 (*a*) sequentially through the drivetrain members 159, 156 and 160 to the low speed rotating structure 74, (b) sequentially through the drivetrain members 159, 156, 158, 164, 161 and 162 to the accessory rotors 150, and/or (c) sequentially through the drivetrain members 159, 156, 158, 164 and 161 to the second machine rotor 140B. During this first boost engine mode, the second electric machine 28B may operate as an electric generator.

Electricity generated by the second electric machine 28B may be stored in a power storage of the electrical system 148 and/or provided to the first electric machine 28A to further boost power to the low speed rotating structure 74. Alternatively, the inter-component drivetrain 32 may also transfer mechanical power from the engine rotating structure 116 sequentially through the drivetrain members 159, 156 and 160 to the first machine rotor 140A. The first electric machine 28A may thereby also operate as an electric generator. Still alternatively, the first electric machine 28A and/or the second electric machine 28B may be non-operational. During the first boost engine mode of FIG. 9A, the fluid clutch 168 is disengaged.

Figure 9B:
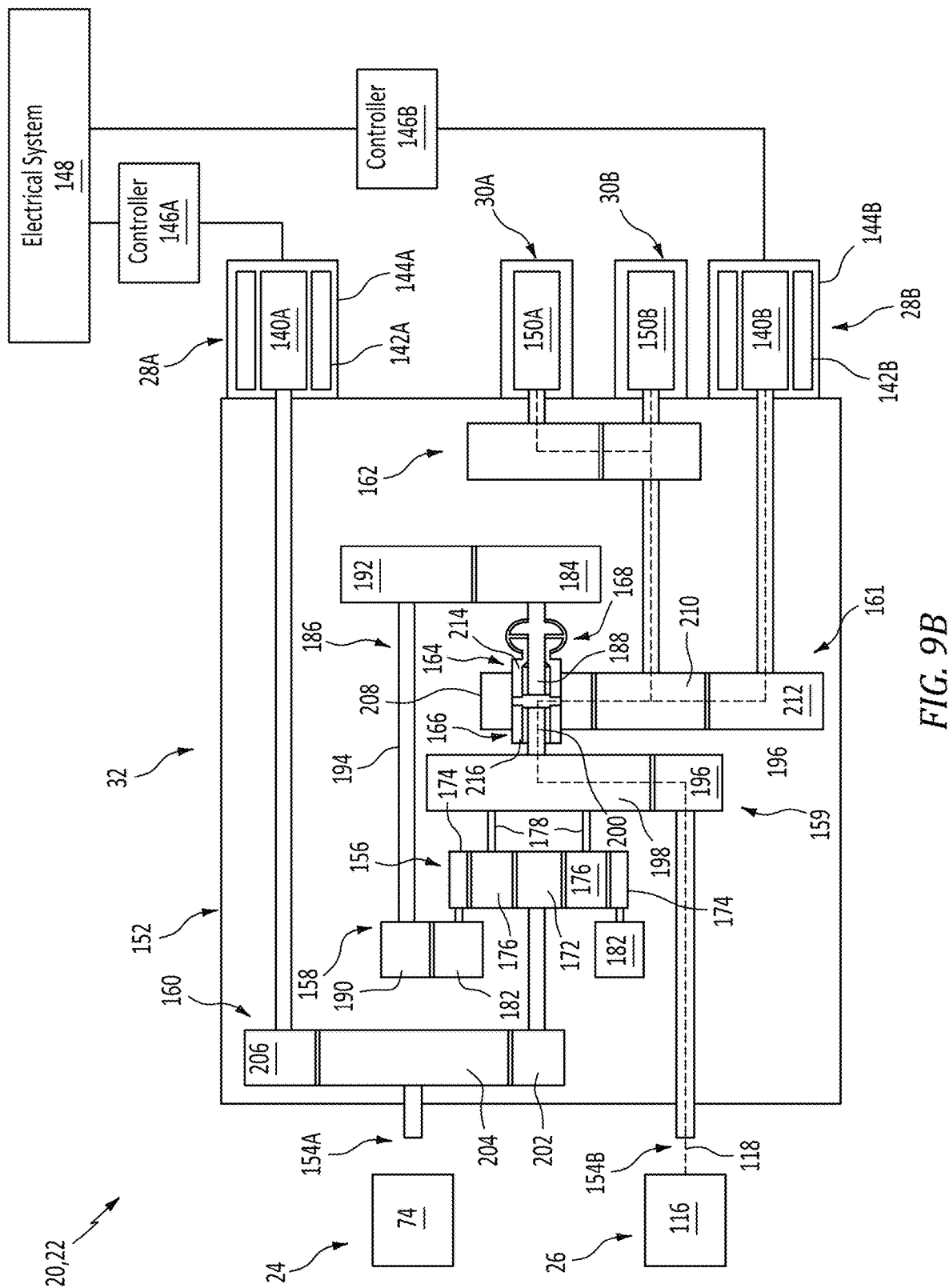

During the second boost engine mode of FIG. 9B, the boost turbine engine 26 may be operated to boost (or completely power) operation of one or more of the aircraft powerplant members 28B, 30A and 30B. The inter-component drivetrain 32 may transfer mechanical power from the engine rotating structure 116 (a) sequentially through the drivetrain members 159, 166, 161 and 162 to the accessory rotors 150, and/or (b) sequentially through the drivetrain members 159, 166 and 161 to the second machine rotor 140B. During this second boost engine mode, the second electric machine 28B may operate as an electric generator. Electricity generated by the second electric machine 28B may be stored in the power storage of the electrical system 148 and/or provided to the first electric machine 28A to boost power to the low speed rotating structure 74. Alternatively, the first electric machine 28A and/or the second electric machine 28B may be non-operational. During the second boost engine mode of FIG. 9B, the fluid clutch 168 is disengaged.

Figure 9C:
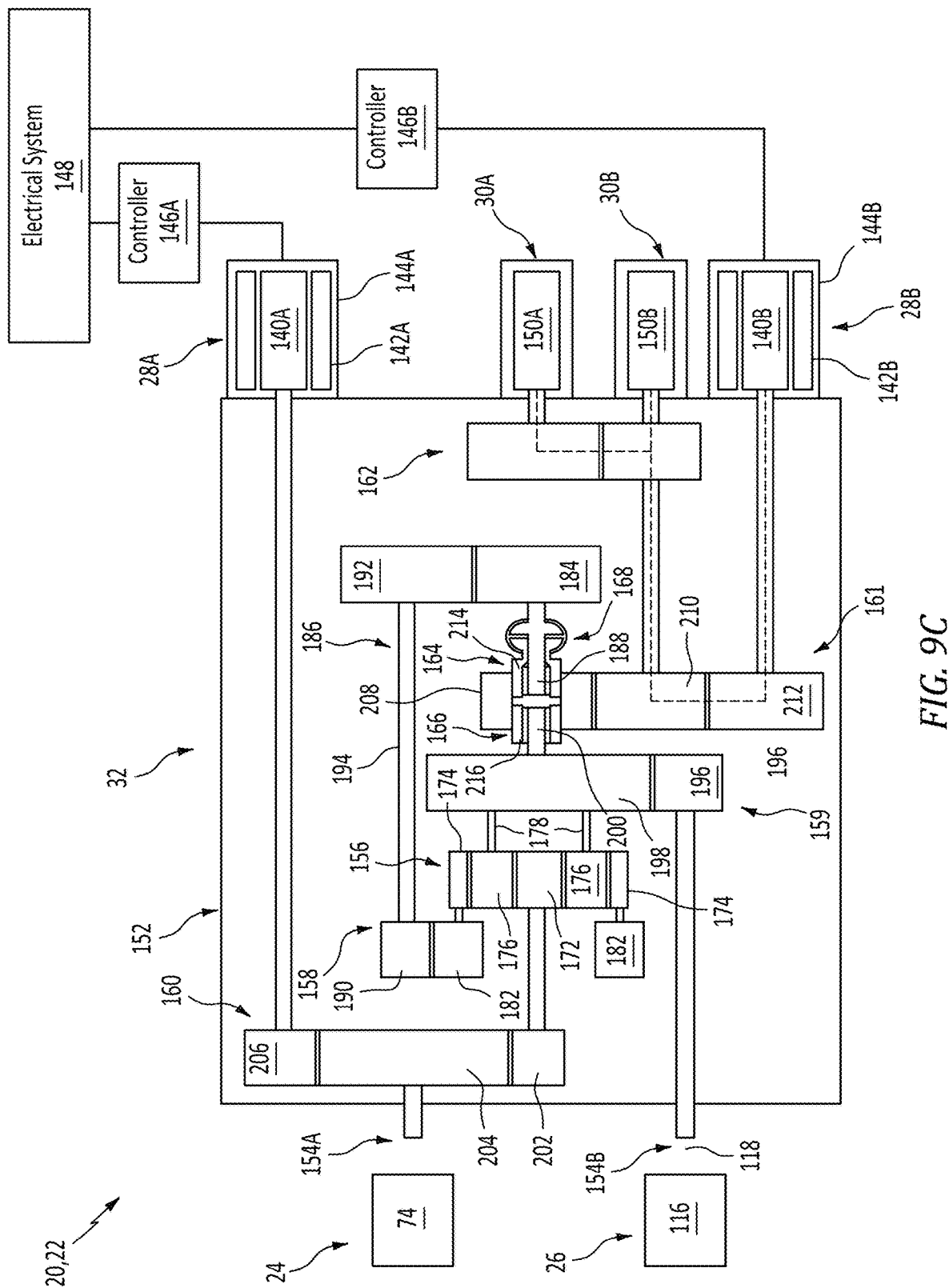

During the hybrid-electric mode of FIG. 9C, the boost turbine engine 26 may be at low idle or depowered (e.g., non-operational, turned off, etc.). The second electric machine 28B may thereby be operated to power operation of the powerplant accessories 30. The inter-component drivetrain 32 may transfer mechanical power from the second machine rotor 140B sequentially through the fourth gear system 161 and the fifth gear system 162 to the accessory rotors 150. Note, mechanical power may gradually be provided to the powerplant accessories 30 from the second electric machine 28B as the boost turbine engine 26 is throttled down and/or depowered. The powerplant accessories 30 may thereby continue to receive (e.g., uninterrupted and/or continuous) mechanical power throughout various modes of operation. During the hybrid-electric mode of FIG. 9C, the fluid clutch 168 is disengaged.

Figure 9D:
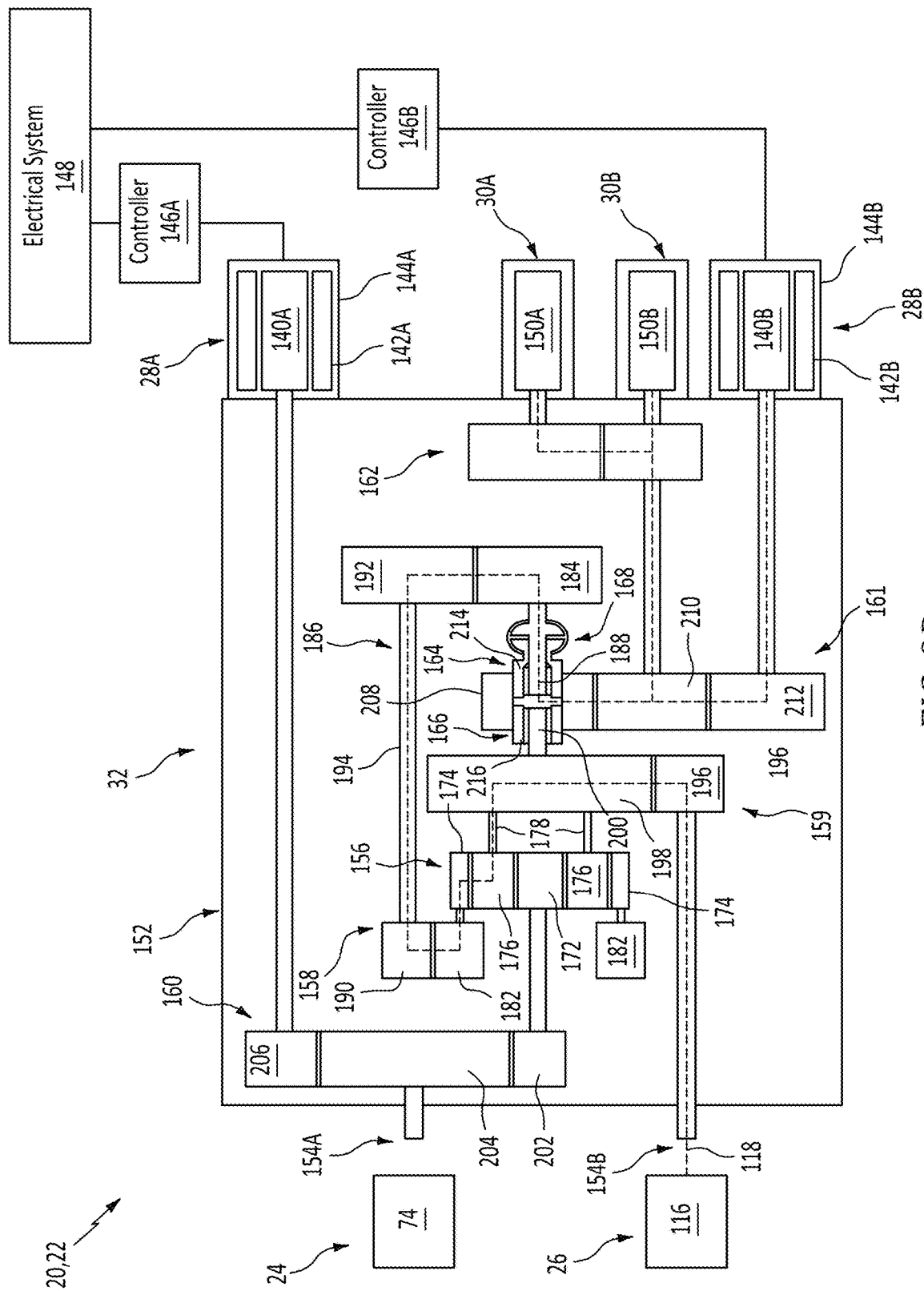

At a beginning of the start mode of FIG. 9D, the boost turbine engine 26 is depowered. The fluid clutch 168 is engaged (see FIG. 8A), and the second electric machine 28B is operated as an electric motor to drive rotation of the engine rotating structure 116 sequentially through the drivetrain members 161, 164, 158, 156 and 159. The second electric machine 28B may thereby be operated as a starter motor for the boost turbine engine 26 during a startup sequence for the boost turbine engine 26.

Figure 10:
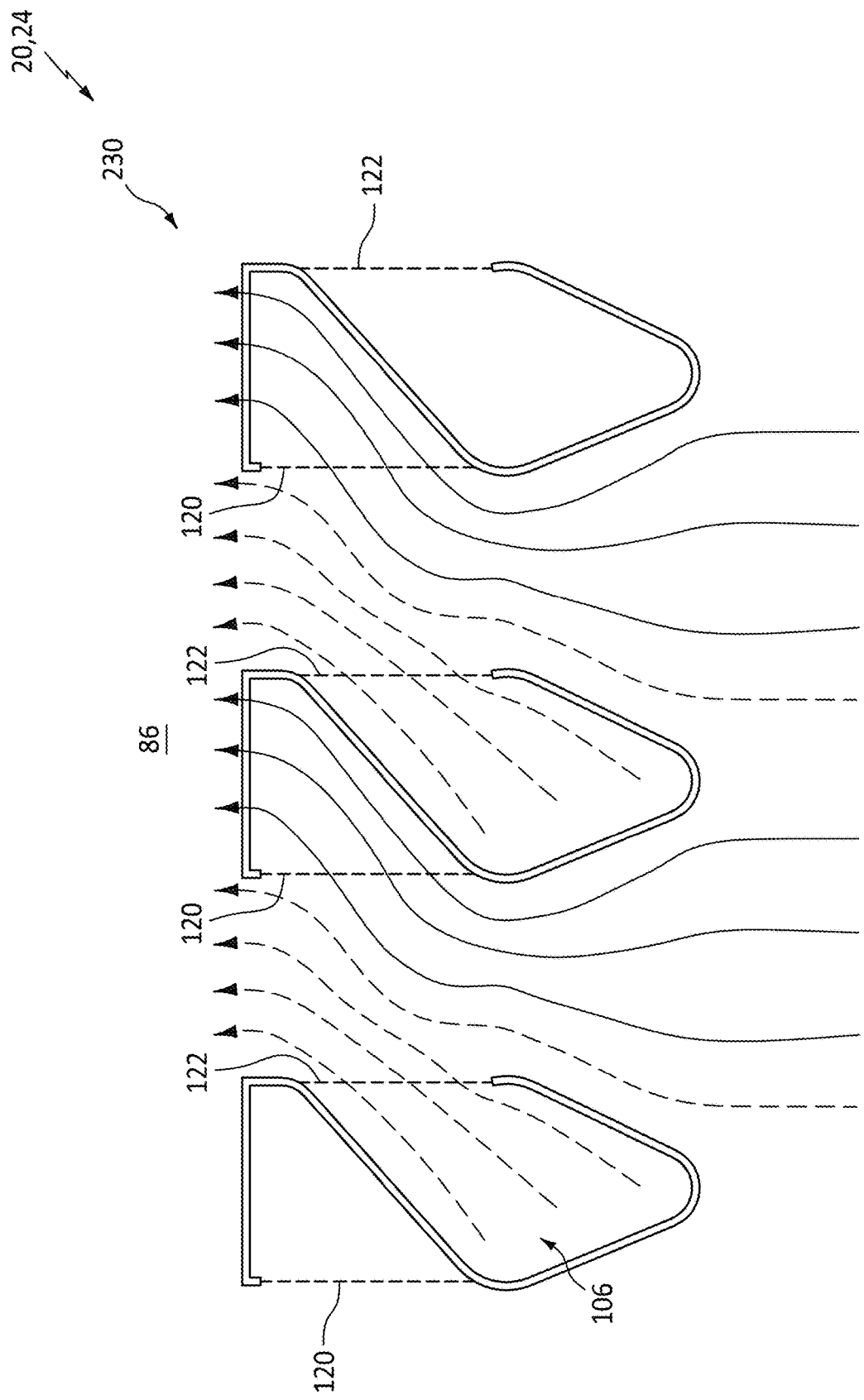
FIG. 10 is a partial plan view illustration of a boost engine flowpath of the boost turbine engine fluidly coupled with a core flowpath of the propulsion turbine engine.

In some embodiments, referring to FIG. 2, the flowpath inlet 120 may be arranged upstream of the flowpath outlet 122 along the core flowpath 86. In other embodiments, referring to FIG. 10, the flowpath inlet 120 may alternatively be arranged downstream of the flowpath outlet 122 along the core flowpath 86. The flowpath inlet 120 and the flowpath outlet 122, for example, may be arranged with a stator vane structure 230 configured to reduce or prevent ingestion of the combustion products exhausted from the flowpath outlet 122 into the flowpath inlet 120.

In some embodiments, referring to FIG. 2, the propulsor rotor 44 may be configured as a ducted propulsor rotor such as a fan rotor. The propulsor rotor 44 of FIG. 2, for example, is housed within the outer engine case 64. In other embodiments, however, the outer housing structure 52 may be omitted such that the propulsor rotor 44 is an open propulsor rotor exposed to and disposed in an environment external to the aircraft and its aircraft powerplant 20.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:
a first powerplant component comprising a first component rotor;
a differential geartrain comprising a first geartrain component and a second geartrain component;
a first clutch configured to operatively couple the first geartrain component to the first component rotor during a first mode, and the first clutch configured to operatively decouple the first geartrain component from the first component rotor during a second mode;
a second clutch configured to operatively decouple the second geartrain component from the first component rotor during the first mode, and the second clutch configured to operatively couple the second geartrain component to the first component rotor during the second mode; and
a first turbine engine comprising a first engine rotating structure operatively coupled to the second geartrain component.

2. The assembly of claim 1, further comprising an accessory gearbox including the differential geartrain, the first clutch and the second clutch, the first powerplant component configured as a powerplant accessory mounted to the accessory gearbox.

3. The assembly of claim 1, wherein
the first powerplant component is configured as an electric machine; and
the electric machine is configurable as at least one of an electric motor or an electric generator.

4. The assembly of claim 3, further comprising:
an accessory gearbox including the differential geartrain, the first clutch and the second clutch; and
a powerplant accessory mounted to the accessory gearbox, the powerplant accessory comprising an accessory rotor operatively coupled to the first geartrain component through the first clutch during the first mode, and the accessory rotor operatively coupled to the first geartrain component through the second clutch during the second mode.

5. The assembly of claim 4, wherein the accessory rotor is operatively coupled to the first component rotor independent of the first clutch and the second clutch.

6. The assembly of claim 1, further comprising:
a second turbine engine comprising a second engine rotating structure operatively coupled to a third geartrain component;

the differential geartrain further comprising the third geartrain component.

7. The assembly of claim 6, further comprising a propulsor rotor operatively coupled to the second engine rotating structure.

8. The assembly of claim 7, further comprising:
a gear system operatively coupling the first engine rotating structure to the third geartrain component;
the propulsor rotor operatively coupled to the second engine rotating structure independent of the gear system.

9. The assembly of claim 6, further comprising:
an electric machine comprising an electric machine rotor, the electric machine configurable as at least one of an electric motor or an electric generator; and
a gear system operatively coupling the second engine rotating structure and the electric machine rotor to the third geartrain component.

10. The assembly of claim 9, wherein the electric machine rotor is operatively coupled to the second engine rotating structure through the gear system.

11. The assembly of claim 6, wherein
the first turbine engine includes a first engine flowpath, a first engine compressor section, a first engine combustor section and a first engine turbine section;
the first engine flowpath extends through the first engine compressor section, the first engine combustor section and the first engine turbine section from a first engine flowpath inlet into the first engine flowpath to a first engine flowpath outlet from the first engine flowpath;
the second turbine engine includes a second engine flowpath, a second engine compressor section, a second engine combustor section and a second engine turbine section;
the second engine flowpath extends through the second engine compressor section, the second engine combustor section and the second engine turbine section from a second engine flowpath inlet into the second engine flowpath to a second engine flowpath exhaust from the second engine flowpath; and
the first engine flowpath inlet and the first engine flowpath outlet each fluidly coupled with the second engine flowpath.

12. The assembly of claim 11, wherein
the second engine combustor section comprises a second engine combustor; and
the first engine flowpath inlet and the first engine flowpath outlet are each fluidly coupled with the second engine flowpath upstream of the second engine combustor.

13. The assembly of claim 11, wherein the first engine flowpath inlet is at or upstream of the first engine flowpath outlet along the second engine flowpath.

14. The assembly of claim 1, wherein the first engine rotating structure is operatively coupled to the second geartrain component independent of the second clutch.

15. The assembly of claim 1, wherein the differential geartrain includes a sun gear;
a ring gear comprising the first geartrain component, the ring gear circumscribing the sun gear;
a plurality of intermediate gears disposed between and meshed with the sun gear and the ring gear; and
a carrier comprising the second geartrain component, the plurality of intermediate gears rotatably mounted to the carrier.

16. The assembly of claim 15, further comprising a second turbine engine comprising a second engine rotating structure operatively coupled to the sun gear.

17. The assembly of claim 1, further comprising a fluid clutch configured to operatively couple the first component rotor to the first geartrain component independent of the first clutch during a third mode.

18. An assembly for an aircraft powerplant, comprising:
a first powerplant component comprising a first component rotor;
a differential geartrain comprising a first geartrain component, a second geartrain component and a third geartrain component;
a first clutch configured to operatively couple the first geartrain component to the first component rotor during a first mode, and the first clutch configured to operatively decouple the first geartrain component from the first component rotor during a second mode;
a second clutch configured to operatively decouple the second geartrain component from the first component rotor during the first mode, and the second clutch configured to operatively couple the second geartrain component to the first component rotor during the second mode; and
a turbine engine comprising an engine rotating structure operatively coupled to the third geartrain component.

19. The assembly of claim 18, wherein the differential geartrain includes
a sun gear comprising the third geartrain component;
a ring gear comprising the first geartrain component, the ring gear circumscribing the sun gear;
a plurality of intermediate gears disposed between and meshed with the sun gear and the ring gear; and
a carrier comprising the second geartrain component, the plurality of intermediate gears rotatably mounted to the carrier.

20. An assembly for an aircraft powerplant, comprising:
a first gear system;
a second gear system;
a third gear system;
a first sprag clutch configured to operatively couple the first gear system to the third gear system during a first mode, and the first sprag clutch configured to operatively decouple the first gear system from the third gear system during a second mode;
a second sprag clutch configured to operatively decouple the second gear system from the third gear system during the first mode, and the second sprag clutch configured to operatively couple the second gear system to the third gear system during the second mode; and
a fluid clutch configured to operatively couple the first gear system to the third gear system independent of the first sprag clutch during a third mode.

* * * * *